(12) United States Patent
Calderaio

(10) Patent No.: US 12,171,375 B2
(45) Date of Patent: Dec. 24, 2024

(54) CUP

(71) Applicant: Calderco Holdings Group, LLC, Jupiter, FL (US)

(72) Inventor: John P. Calderaio, Jupiter, FL (US)

(73) Assignee: Calderco Holdings Group, LLC, North Palm Beach, FL (US)

(\*) Notice: Subject to any disclaimer, the term of this patent is extended or adjusted under 35 U.S.C. 154(b) by 0 days.

(21) Appl. No.: 18/220,598

(22) Filed: Jul. 11, 2023

(65) Prior Publication Data
US 2023/0346168 A1    Nov. 2, 2023

Related U.S. Application Data

(63) Continuation of application No. 17/201,550, filed on Mar. 15, 2021, now Pat. No. 11,737,606, which is a continuation of application No. 16/372,953, filed on Apr. 2, 2019, now Pat. No. 10,973,373, which is a continuation-in-part of application No. 15/861,481, filed on Jan. 3, 2018, now Pat. No. 10,638,862.

(60) Provisional application No. 62/747,503, filed on Oct. 18, 2018, provisional application No. 62/651,508, filed on Apr. 2, 2018.

(51) Int. Cl.
| | |
|---|---|
| *A47J 43/27* | (2006.01) |
| *A47G 19/22* | (2006.01) |
| *B65D 25/24* | (2006.01) |

(52) U.S. Cl.
CPC .......... *A47J 43/27* (2013.01); *A47G 19/2205* (2013.01); *B65D 25/24* (2013.01)

(58) Field of Classification Search
CPC .......... A47G 19/00–2205; B65D 77/00–0493; B65D 1/00–265
See application file for complete search history.

(56) References Cited

U.S. PATENT DOCUMENTS

| | | |
|---|---|---|
| 1,829,664 A | 10/1931 | McKay |
| D86,379 S | 3/1932 | Kizinski |
| 2,120,862 A | 6/1938 | Heller |
| 2,187,558 A | 1/1940 | Kushima |
| D124,555 S | 1/1941 | Platt |
| 2,328,872 A | 9/1943 | Yealdhall et al. |
| D138,638 S | 8/1944 | Erbe |
| 2,374,092 A | 4/1945 | Glaser |
| 2,665,571 A | 1/1954 | Lochead |
| D173,106 S | 9/1954 | Foster |
| 3,565,281 A | 2/1971 | Collie |
| 3,590,989 A | 7/1971 | Wittwer |

(Continued)

FOREIGN PATENT DOCUMENTS

| | | |
|---|---|---|
| DE | 8130690 U1 | 3/1982 |
| FR | 2759976 A1 | 8/1998 |

(Continued)

OTHER PUBLICATIONS

"Reclaimed Wine Bottle Glasses", Green Head, Mar. 12, 2015 (5 Pages).

*Primary Examiner* — Kareen K Thomas
(74) *Attorney, Agent, or Firm* — Breiner & Breiner, L.L.C.

(57) ABSTRACT

A single serve beverage cup, including for a cocktail, is disclosed having a base, a bowl, a seal, a top cover and a bottom cover. The single-serve beverage cup includes a cavity for receiving a miniature liquor bottle for making a cocktail. There are disclosed various embodiments of the bottom cover.

18 Claims, 22 Drawing Sheets

(56) References Cited

U.S. PATENT DOCUMENTS

| | | | |
|---|---|---|---|
| 3,741,383 A | 6/1973 | Wittwer | |
| 4,324,338 A | 4/1982 | Beall | |
| 4,410,085 A | 10/1983 | Beneziat et al. | |
| 4,416,370 A | 11/1983 | Beall | |
| 4,485,636 A * | 12/1984 | Hilado | F25D 3/08 62/457.3 |
| 5,271,508 A | 12/1993 | Gamwell | |
| 5,673,789 A | 10/1997 | Degraff-Eugene | |
| 5,769,680 A | 6/1998 | Hoffman | |
| 5,996,781 A | 12/1999 | Glaser et al. | |
| 6,066,021 A | 5/2000 | Lee | |
| 6,179,153 B1 | 1/2001 | Huang | |
| D448,619 S | 10/2001 | Pau | |
| 6,520,543 B1 | 2/2003 | Hoar | |
| 6,964,492 B1 | 11/2005 | Nicklowitz | |
| D533,405 S | 12/2006 | Barducci | |
| 7,217,434 B1 * | 5/2007 | Loh | B65D 81/3205 206/217 |
| D560,098 S | 1/2008 | Barducci | |
| 7,322,466 B2 | 1/2008 | Alonso | |
| D615,363 S | 5/2010 | Lion et al. | |
| D623,477 S | 9/2010 | Ross | |
| 7,845,489 B2 | 12/2010 | Thompson | |
| 7,845,512 B2 | 12/2010 | Skala | |
| D704,002 S | 5/2014 | Gooris | |
| D729,013 S | 5/2015 | Riedel | |
| D731,855 S | 6/2015 | Riedel | |
| D742,173 S | 11/2015 | Perman | |
| D760,030 S | 6/2016 | Wilson et al. | |
| D792,157 S | 7/2017 | Di Giuseppantonio | |
| D809,345 S | 2/2018 | Calderaio | |
| 10,287,084 B2 | 5/2019 | Yahalom | |
| 10,390,640 B2 | 8/2019 | Turner et al. | |
| 10,604,336 B1 | 3/2020 | Bergida et al. | |
| 10,638,862 B2 | 5/2020 | Calderaio | |
| 10,973,348 B2 | 4/2021 | Calderaio | |
| 11,737,606 B2 | 8/2023 | Calderaio | |
| 2003/0104191 A1 | 6/2003 | Yokoo et al. | |
| 2005/0139570 A1 | 6/2005 | Lambert et al. | |
| 2006/0273087 A1 | 12/2006 | Crawford | |
| 2007/0158356 A1 | 7/2007 | Cunningham | |
| 2008/0023348 A1 | 1/2008 | Herzog et al. | |
| 2008/0042422 A1 | 2/2008 | Maluso | |
| 2010/0294770 A1 | 11/2010 | Wing et al. | |
| 2011/0132781 A1 | 6/2011 | Willat et al. | |
| 2012/0043243 A1 | 2/2012 | Selina | |
| 2013/0313220 A1 | 11/2013 | Scott | |
| 2014/0048204 A1 | 2/2014 | Hunter et al. | |
| 2014/0165847 A1 | 6/2014 | Suprina | |
| 2014/0332495 A1 | 11/2014 | Choi et al. | |
| 2014/0374374 A1 | 12/2014 | Scott | |
| 2015/0069056 A1 | 3/2015 | Kishimoto et al. | |
| 2015/0183626 A1 | 7/2015 | Protzman | |
| 2015/0305532 A1 | 10/2015 | Fishbone | |
| 2016/0353909 A1 | 12/2016 | Fishbone | |
| 2017/0251849 A1 | 9/2017 | Zanatta et al. | |
| 2018/0092478 A1 | 4/2018 | Wilson et al. | |
| 2018/0132638 A1 | 5/2018 | Bergida et al. | |

FOREIGN PATENT DOCUMENTS

| | | |
|---|---|---|
| GB | 2289252 A | 11/1995 |
| GB | 2385577 A | 8/2003 |
| WO | 2007056815 A1 | 5/2007 |

* cited by examiner

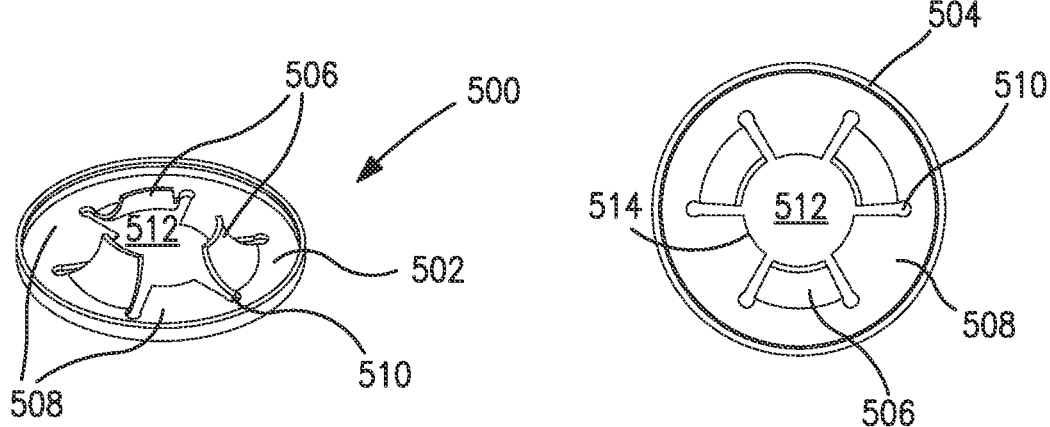
FIG. 16A   FIG. 16B
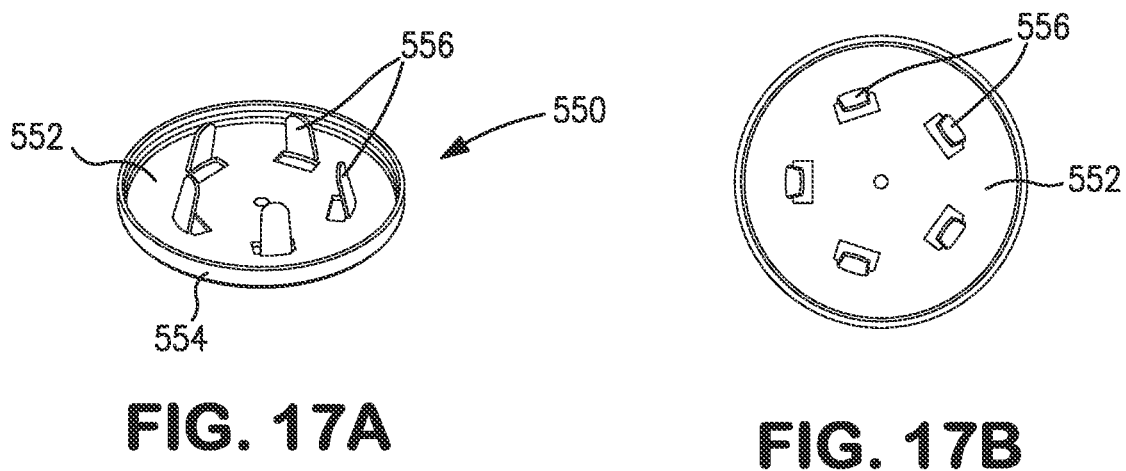
FIG. 17A   FIG. 17B

CUP

RELATED APPLICATIONS

This application is a continuation of U.S. Application Ser. No. 17/201,550, filed Mar. 15, 2021, entitled "Cup," which is a continuation of U.S. application Ser. No. 16/372,953, filed Apr. 2, 2019, entitled "Single Serve Beverage Cup," now U.S. Pat. No. 10,973,373, which is a continuation-in-part of U.S. Application Ser. No. 15/861,481, filed Jan. 3, 2018, entitled "Cup," now U.S. Pat. No. 10,638,862, and which applications are incorporated herein by reference in their entirety. This application claims benefit of U.S. Provisional Application Ser. No. 62/651,508, filed Apr. 2, 2018, entitled "Cup," and U.S. Provisional Application Ser. No. 62/747,503, filed Oct. 18, 2018, entitled "Cup," and which applications are incorporated herein by reference in their entireties.

FIELD OF THE INVENTION

The present invention relates to a cup. More particularly, the invention relates to a single serve beverage cup, including a single serve beverage cup for wine and cocktails, and methods of filling the cup.

BACKGROUND OF THE INVENTION

Single serve beverage containers for wine are known in the art. For example, single serve beverage containers for wine include a base, a stem and a bowl for containing the wine. Such containers are not suitable for certain activities including at outdoor events such as concerts or sporting events as they do not fit into cup holders, they tip over easily and are subject to breaking at the stem. Other single serve beverage containers for wine are known such as pouches. Such containers are not attractive and are not particularly palatable when drinking a fine wine. Accordingly, there is a need in the market for a single serve beverage cup for wine or other beverage which is easy to grasp; is stable and not subject to tipping over or breakage; is aesthetically pleasing; is easy to drink from; is easy to manufacture and fill; and provides additional benefits over the known containers.

SUMMARY OF THE INVENTION

A primary object of the present invention is to provide a single serve beverage cup.

Another primary object of the present invention is to provide a single serve beverage cup for wine.

Another primary object of the present invention is to provide a single serve beverage cup for wine which is suitable for a person to enjoy wine similar to drinking from a fine wine glass.

Another primary object of the present invention is to provide a single serve beverage cup for wine which is stable and not subject to tipping over.

Another primary object of the present invention is to provide a single serve beverage cup for wine which is easy to grasp for both men and women having different size hands.

Another primary object of the present invention is to provide a single serve beverage cup for wine which is easy to grasp and precludes heating of the wine by a person's hand.

Another primary object of the present invention is to provide a single serve beverage cup for wine which is easy to manufacture and fill, including providing the required head space in the cup after the cup is filled with wine.

Another primary object of the present invention is to provide a single serve beverage cup for wine which includes an outer package and an inner package.

Another primary object of the present invention is to provide a single serve beverage cup for wine having a base portion which appears frosted and may include a brand logo.

Another primary object of the present invention is to provide a single serve beverage cup for wine which includes a base having an opening in its underside which provides a number of benefits including allowing the cooling of wine in a cooler or using the open area in the base for storage of a material.

Another primary object of the present invention is to provide a single serve beverage cup for wine having a bowl area for receiving a cover for storage of the wine wherein the bowl area has a diameter greater than the diameter of the base of the cup, and wherein the cover may be used as a coaster for the cup.

Another primary object of the present invention is to provide a cup having a base or other cavity which holds a miniature liquor bottle.

Another primary object of the present invention is to provide a cup having a base or other cavity which holds a miniature liquor bottle and a bowl which is filled with a cocktail mix such that the liquor bottle may be removed from the base or other cavity and the liquor poured into the cocktail mix to provide a cocktail.

Another primary object of the present invention is providing a single serve beverage cup which may be filled on a conventional wine filling line.

Another primary object of the present invention is providing a single serve beverage cup for wine and a method of filling the cup with wine.

The cup of the invention comprises a base, a bowl, a seal and a cover. The diameter of the base decreases from the base bottom wall to the bottom of the bowl. The bowl increases in diameter from the bottom of the bowl to the top of the bowl. The base includes an open area in the base. The seal may be, but is not limited to, an induction heat seal.

The cup of the invention further comprises a base, a bowl, a seal and a cover. The diameter of the base decreases from the base bottom wall to the bottom of the bowl. The bowl increases in diameter from the bottom of the bowl to the top of the bowl. The base includes an open area in the base. The bowl may include a punt allowing for, among other things, control over the volume of liquid in the cup and the head space in the cup. The seal may be, but is not limited to, an induction heat seal.

The cup of the invention further comprises a base, a bowl, a seal and a cover. The diameter of the base decreases from the base bottom wall to the bottom of the bowl. The bowl increases in diameter from the bottom of the bowl to the top of the bowl. The base includes an open area in the base. The bowl may include a cavity for receiving a miniature liquor bottle for making a cocktail. The bowl may include a cocktail mix for mixing with the liquor in the miniature liquor bottle. The base includes a closure to retain the miniature liquor bottle in the cup. The closure may include a closure without an opening or a closure with an opening for receiving a miniature liquor bottle through the opening and maintaining the miniature liquor in the cup once it is inserted into the cavity of the cup through the opening in the closures. The seal may be, but is not limited to, an induction heat seal.

The cup of the invention further comprises a base, a bowl, a seal and a cover. The bowl may include a cavity for receiving a miniature liquor bottle for making a cocktail. The bowl may include a cocktail mix for mixing with the liquor in the miniature liquor bottle. The cavity may be in a side of the bowl and include means to hold the miniature liquor bottle in the cavity. In the alternative, the cavity may be in the base of the cup and extending upward into the bowl.

The cup of the invention further comprises an outside packaging and an inside packaging. The outside packaging preferably covers the entire cup and may include product information such as a brand, logo, information on the contents of the cup and similar information. When the cup is to be used, the outside packaging is removed and there is an inside packaging providing information concerning, among other things, the contents of the cup and branding information.

The invention further includes a cup having an aperture in the bottom of the bowl for filling a beverage into the cup in a conventional filling line such as a wine filling line.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIGS. 16A and 16B show views of an alternative base closure.

FIGS. 17A and 17B show views of another alternative base closure.

DETAILED DESCRIPTION OF THE PREFERRED EMBODIMENTS

The present invention is directed to a single serve beverage cup. More specifically, the present invention is directed to a single serve beverage cup for wine or a cocktail. The invention will be described herein with respect to a single serve cup for wine or a cocktail. However, it is understood that the invention may be useful with other beverages or contents. For example, the single serve beverage cup may be used for (1) an energy drink with the active ingredient held in the base or cavity and the drink mix in the bowl; (2) a coffee drink with the coffee in the bowl and a coffee additive in the base or cavity; or (3) a cannabidiol ("CBD") beverage with the CBD held in the base or the cavity and the beverage in the bowl.

Single serve containers for wine have become popular among consumers, especially consumers of fine wines. For example, some people wish to have a glass of wine and do not wish to open a whole bottle of wine which may not save well over time. Additionally, single serve containers for wine have become popular at events such as concerts and sporting events. Consumers of single serve containers for wine, however, desire to have a container having the attributes of a wine glass in order to more fully enjoy the experience of sipping the wine. The single serve cup must, therefore, be easy to open and sip the wine from. The lip of the cup must be such that the wine may be enjoyed, e.g. there are no threads on the cup lip interfering with the sipping of the wine. Similarly, the wine cup must be easy to hold and feel comfortable in the user's hand. The wine cup should be easy to grasp below the bowl of the cup such that it is easy to sip the wine, and the person's hand need not grasp the bowl of the cup thereby heating the wine making the wine less pleasing to drink. The cup must also be such that when used at outdoor events it will be stable and not tip over, may fit into a cup holder, will not break at the stem, and the lip of the cup allowing for comfort in sipping the wine. Similarly, the dimensions and weight of the cup must be such that it is sufficiently heavy to make the cup sturdy and similar to drinking out of a wine glass. The present invention addresses these various aspects of a single serve beverage cup, including for wine and cocktails.

Figure 6B:
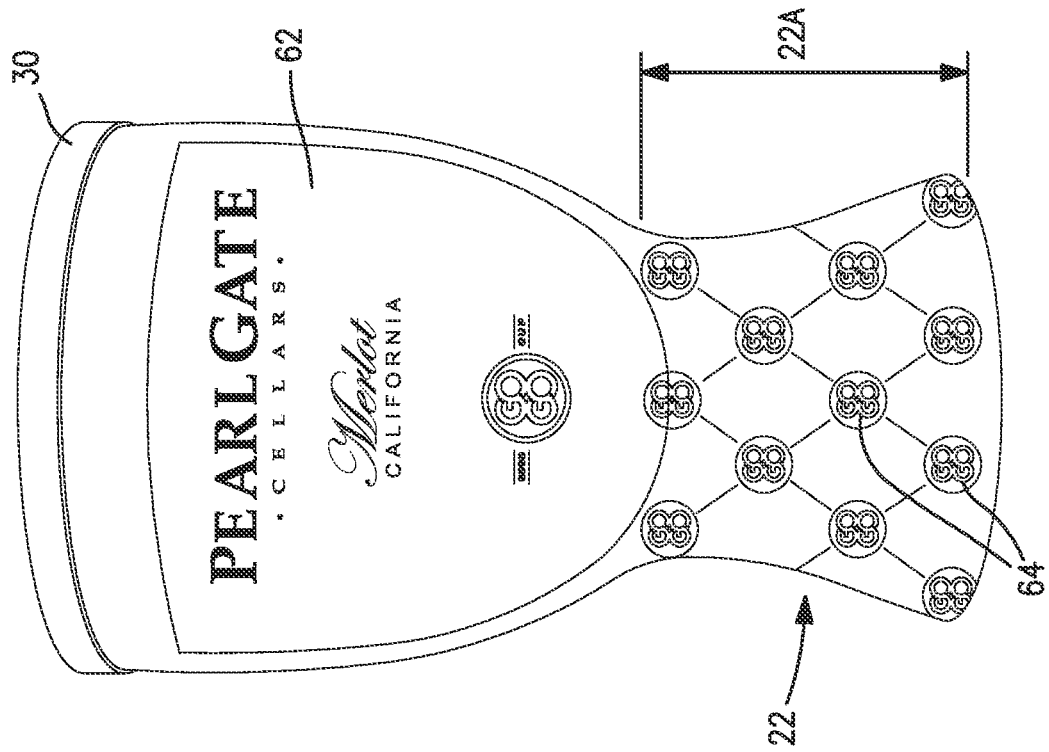
FIG. 6B is a view of the cup of FIG. 6A having the outer package removed from the cup and showing an inner package of the cup.
Figure 6A:
FIG. 6A is a side elevational view of the invention of FIG. 1 showing a cover on the cup and an outer package surrounding the cup.
Figure 8:
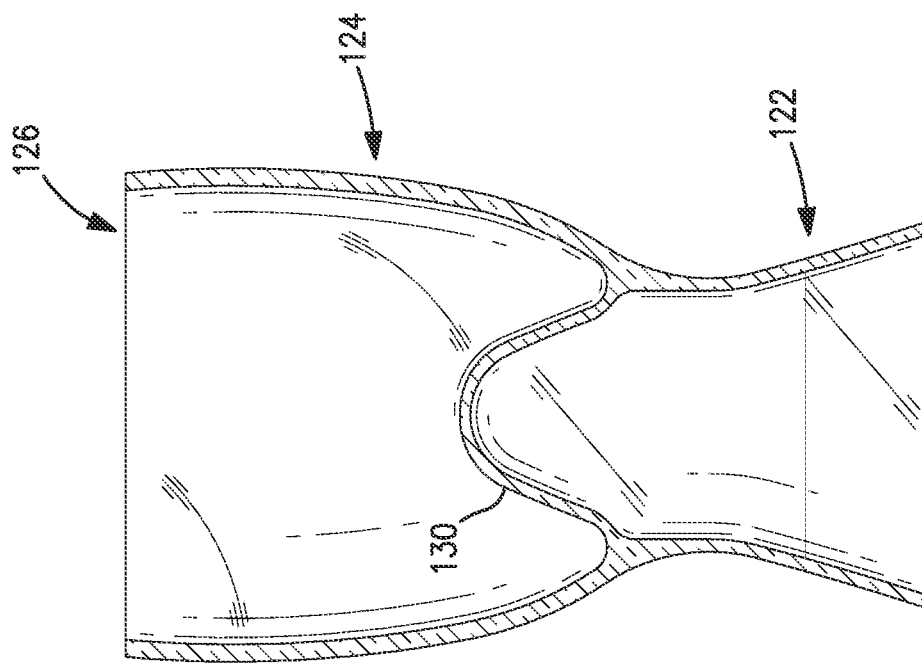
FIG. 8 is a cross-section of the cup of FIG. 7 taken along line 8-8 of FIG. 7.
Figure 30:
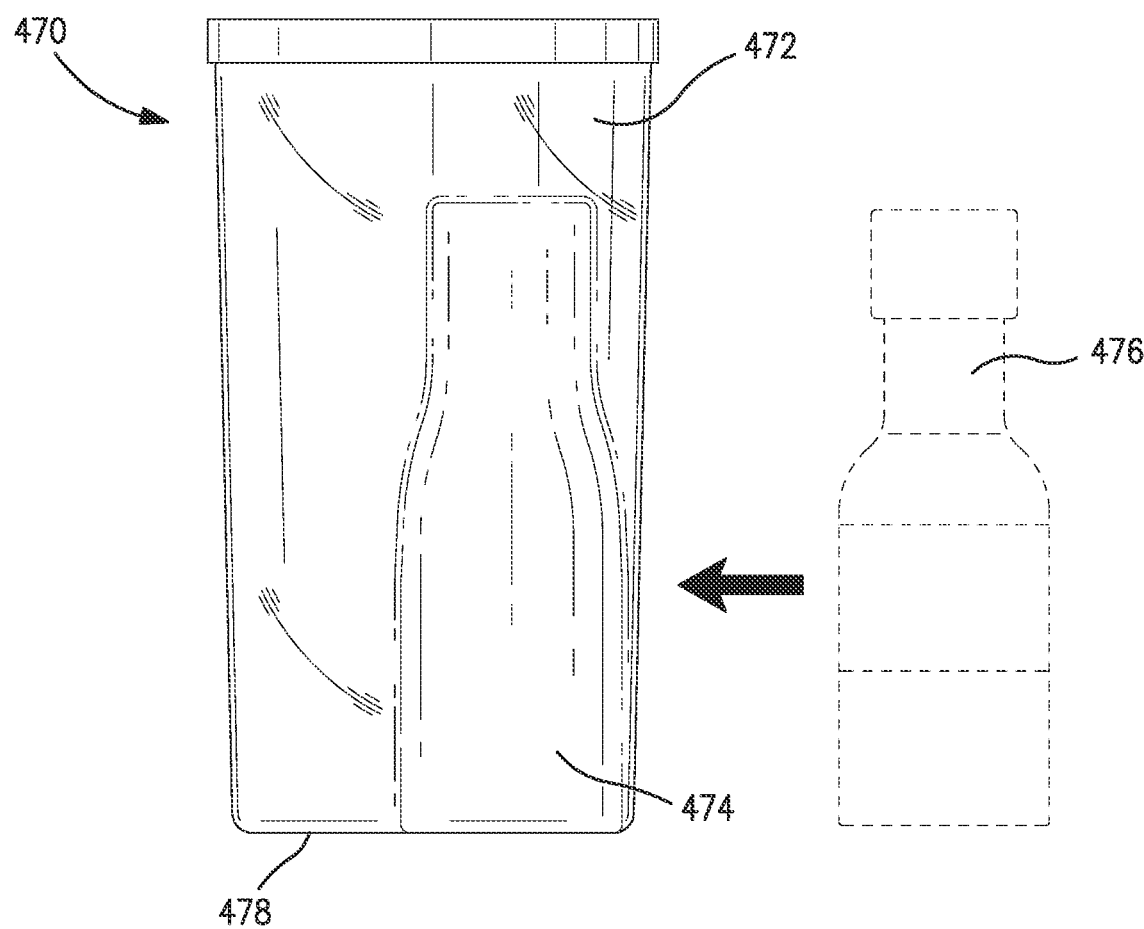
FIG. 30 is another embodiment of the invention showing a perspective view of a cup having a cavity for receiving an article such as a miniature liquor bottle.
Figure 31:
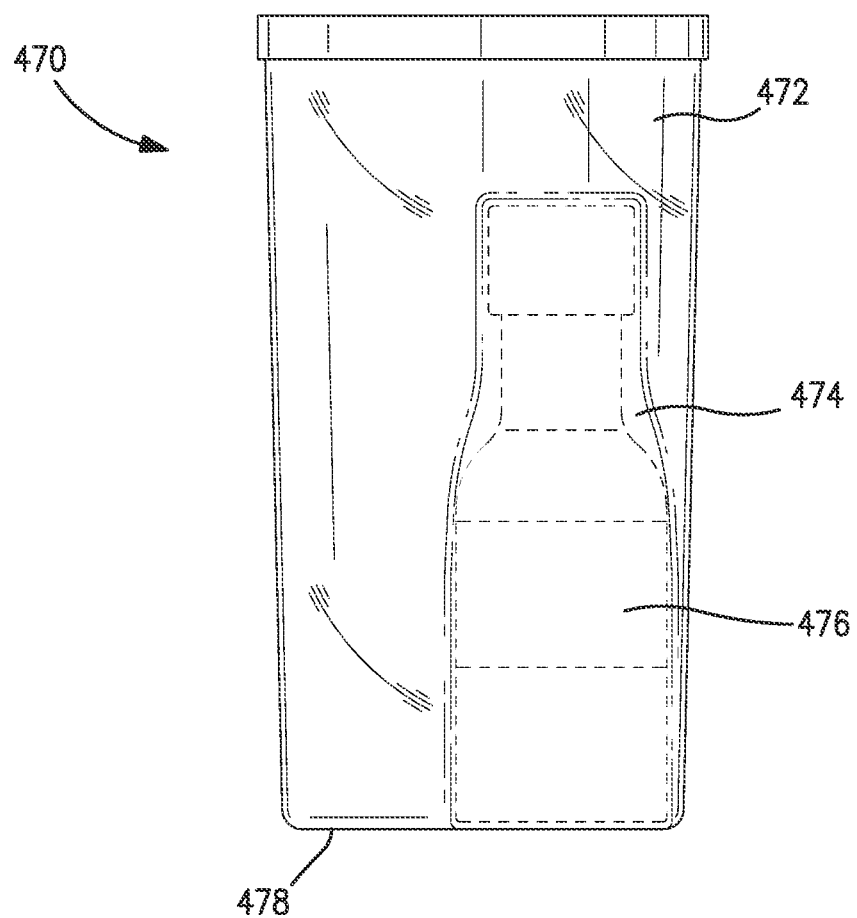
FIG. 31 shows the cup of FIG. 30 with the miniature liquor bottle in the cavity.

FIGS. 1-6 disclose one preferred embodiment of the single serve beverage cup of the present invention. It is understood that the cup may have varying dimensions in size without departing from the scope of the invention as discussed below. The invention will first be described primarily with respect to FIGS. 1-6. FIGS. 7 and 8 show a further embodiment of the invention. FIGS. 9, 10 11, 18 and 19 illustrate a still further embodiment of the invention. FIGS. 12-15 illustrate a manner of filling the cups of FIGS. 1-8 from the bottom of the bowl of the cup in a conventional wine filling line. FIGS. 16-29 illustrate various embodiments of a closure for the cup of FIG. 9. FIGS. 30 and 31 illustrate an alternative embodiment of the cup of FIG. 9.

Referring to FIGS. 1-6, the single serve beverage cup 20 includes a base 22, a bowl 24, an opening 26, a seal 28 and a cover 30. The cup 20 is filled with wine in accordance with manufacturing standards and generally 187 milliliters, comparable to a quarter bottle of a 750 milliliter bottle of wine. There is approximately 0.4 inches to 0.57 inches head space between the cover 30 of the cup and the inside of bowl 24, a presently preferred head space being about 0.55 inches. Once the wine is filled, the cup 20 is sealed with a seal 28 and a cover 30 as described in further detail below.

The cup 20 includes a base 22 having a bottom wall 40, a side wall 42, an opening 44 and a top wall 46 which is the outside portion of the bottom of the bowl 24 as discussed below.

In a presently preferred embodiment, the base 22 of the cup may have the following dimensions: a height from the bottom wall 40 to the top wall 46 in the range of about 1.340 to 1.344 inches; a diameter at the bottom wall in the range of about 2.25 to 2.35 inches. The diameter of bottom wall 40 is smaller than the diameter at the top wall or lip 54 of side wall 50 of bowl 24. Accordingly, the diameter of the base 22 decreases from the bottom wall 40 of the base to the top region 46 of the base.

Figure 9:
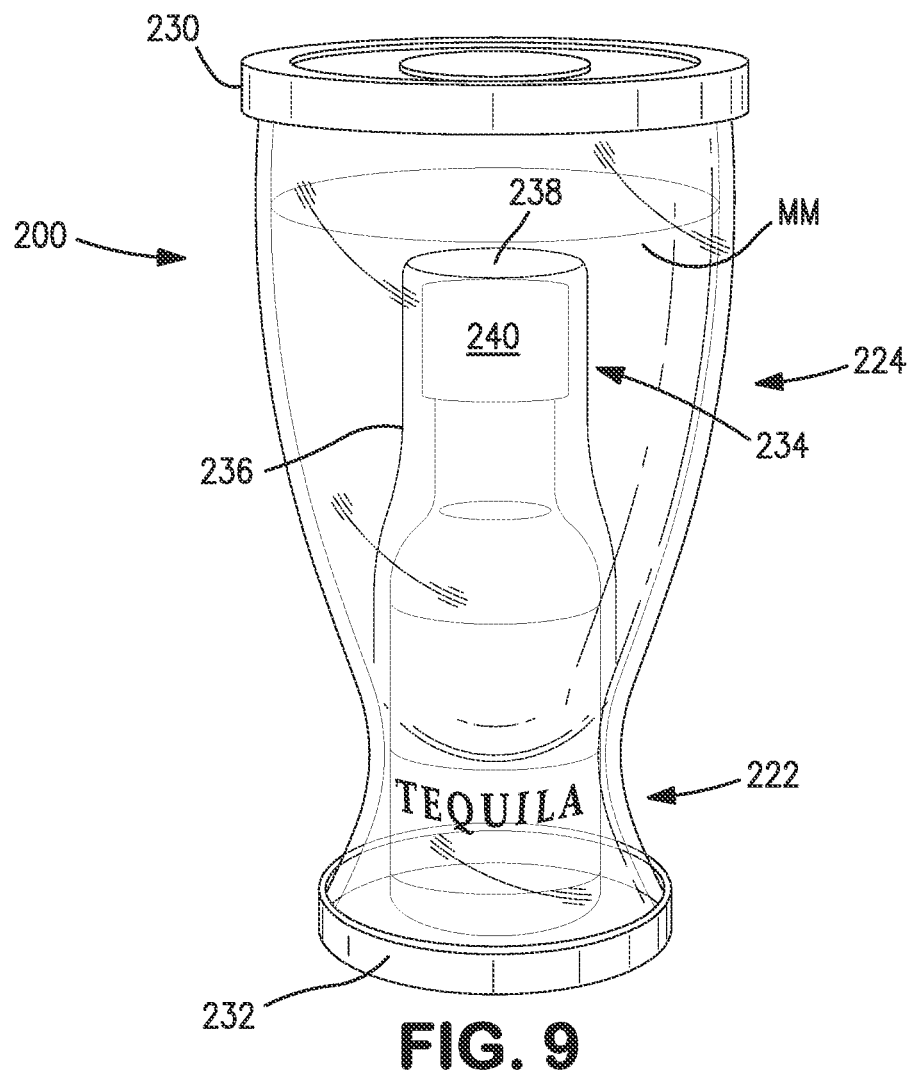
FIG. 9 is another embodiment of the invention showing a perspective view of a cup having a cavity for receiving an article such as a miniature liquor bottle.
Figure 11:
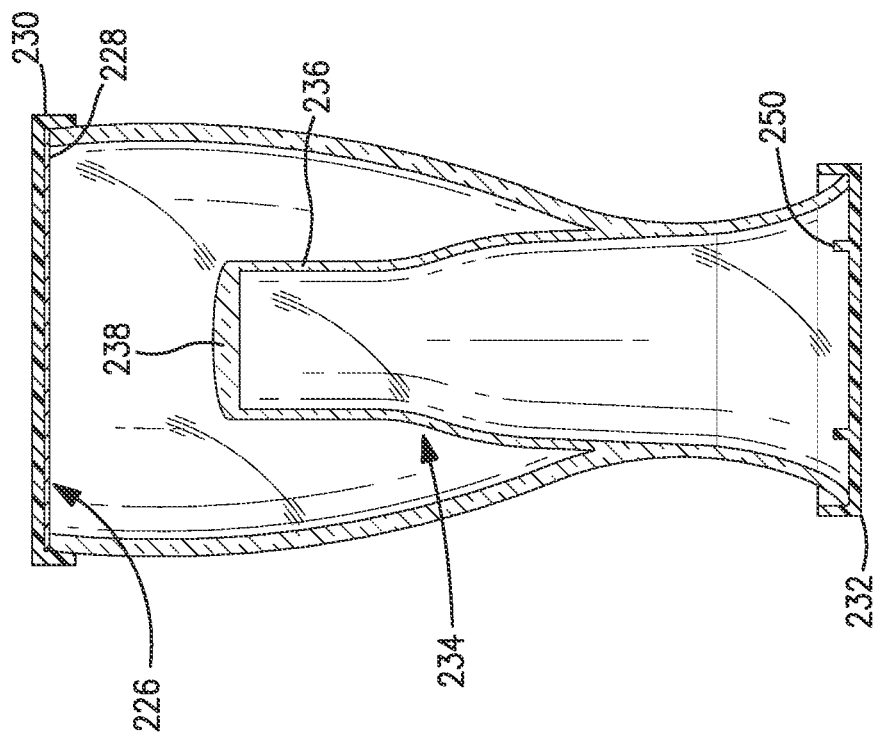
FIG. 11 is a cross-section of the cup of FIG. 10 taken along line 11-11 of FIG. 10 without the miniature liquor bottle.
Figure 10:
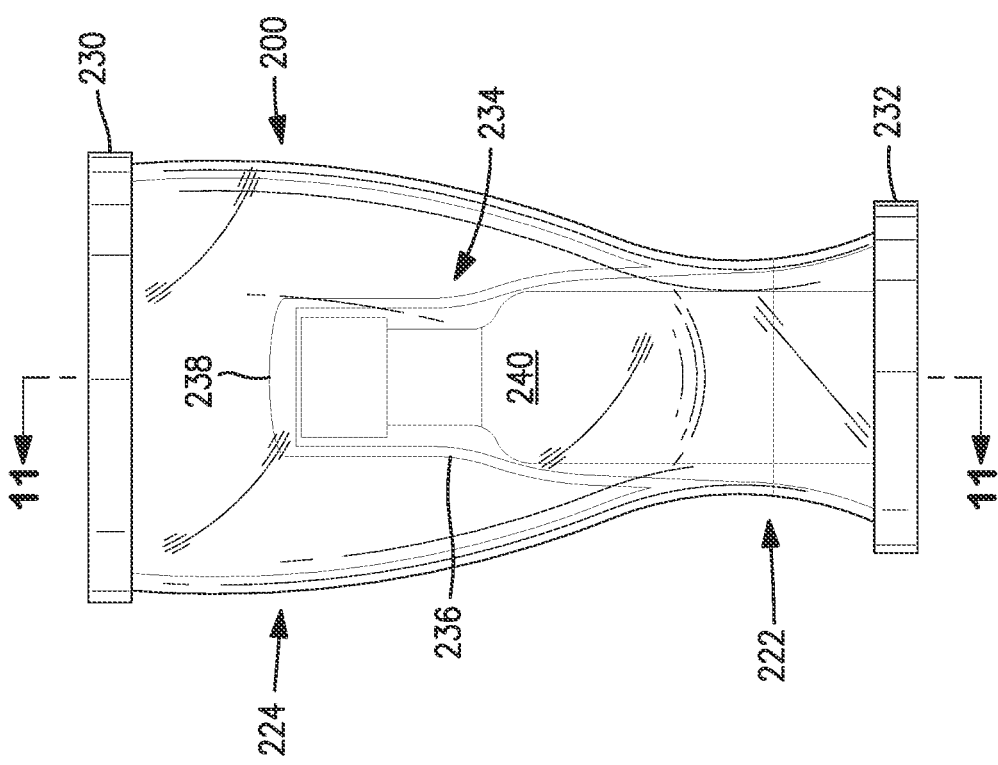
FIG. 10 is a side view of the cup of FIG. 9.

In a preferred embodiment, the opening 44 may provide a number of functions. For example, when the cup 20 is unopened and stored in a cooler, the ice or the ice water in the cooler will enter the opening 44 and cool the wine. In the alternative, the base 22 may serve as a storage space for another item; e.g.: (1) a piece of chocolate candy for eating when drinking a red wine; or (2) a liquid such as alcohol to provide a "shot" in the base for a "double" fill; or (3) a miniature liquor bottle (e.g. one shot) wherein the cup bowl may contain a cocktail mix and the liquor from the liquor bottle is taken from the base and mixed with the cocktail mix (in such case the bottom of the cup bowl may be configured to receive the liquor bottle, e.g. the neck of the liquor bottle extending upward into the molded bottom of the cup bowl or the molded bottom of the cup bowl may include means to engage and fixedly secure the bottle to the cup bowl such as male and female threads or a tongue and groove mechanism). As discussed below, FIGS. 9-11 show the invention with a miniature liquor bottle. In such instances, the base 22 may include a closure at the bottom wall 40 (not shown) to hold the material such as candy or a liquid or a liquor bottle or any other item, e.g. a charm to be placed on the cup base. Similarly, as shown in FIG. 6B, the base 22 may be frosted in the region generally referred to as 22A to give the appearance of a frosted container; or when an item is stored in the base, hiding the visibility of the item; or may include a brand or logo or combinations thereof; or a combination of the above.

Bowl 24 includes side wall 50, a bottom wall 52, and a top wall or lip 54. Lip 54 is preferably made of a thin dimension, e.g. to simulate drinking out of a wine glass for the greater enjoyment of the wine. Lip 54 is also constructed and arranged to receive seal 28 after the cup 20 is filled with wine. In a presently preferred embodiment, the bowl 24 of the cup may have the following dimensions: a height from the bottom wall 52 to the top wall 54 in the range of about 2.70 to 2.90 inches; and a diameter at the top wall 54 in the range of about 2.80 to 2.90 inches. The diameter at top wall 54 is greater than the diameter at the bottom wall 40 of base 22.

In a presently preferred embodiment, the cover 30 and a foil seal 28 is sealed to the bowl 24 by induction sealing means. More specifically, the foil seal 28 is an induction sealing foil which is attached to the underside of the cover 30. Cover 30 is sealed to bowl 24 by induction sealing. In this process, cover 30 is placed on bowl 24 and pressed onto the container under pressure. It is understood, however, that other materials may be used for the seal such as plastic or paper when not using an induction sealing process. In another preferred embodiment, cover 30 may snap onto the cup, for example, by having a rib in cover 30 and groove in the outside of bowl 24 (not shown) or vice versa. Other known snap-on members and/or closure members may be used for connecting the cover 30 with foil 28 to bowl 24, e.g. by friction fit. Additionally, a screw cover may be used, preferably where the screw threads on the bowl do not interfere with sipping the wine.

Figure 1:
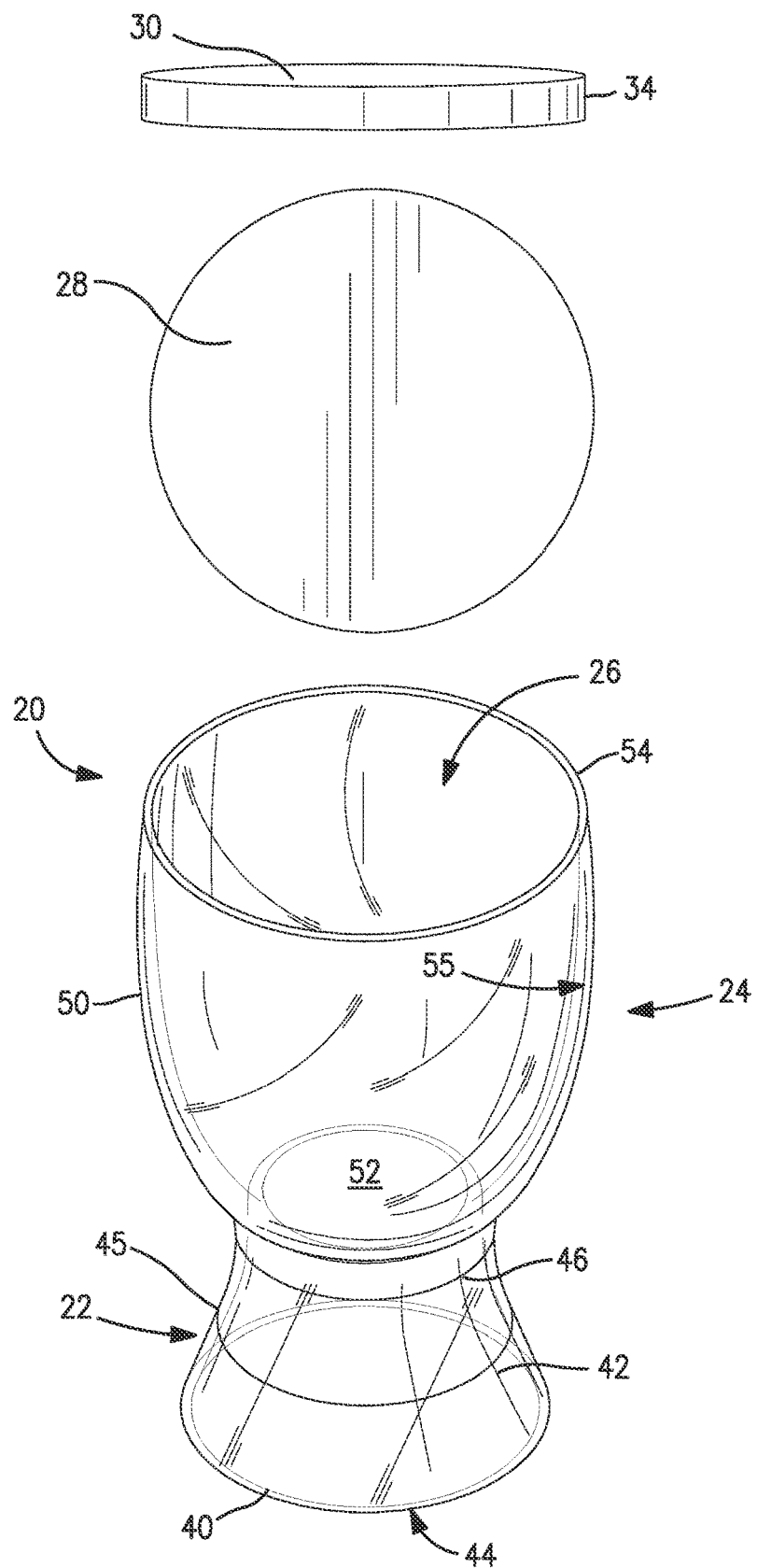
FIG. 1 is a side elevational exploded perspective view of the cup of the present invention.
Figure 2:
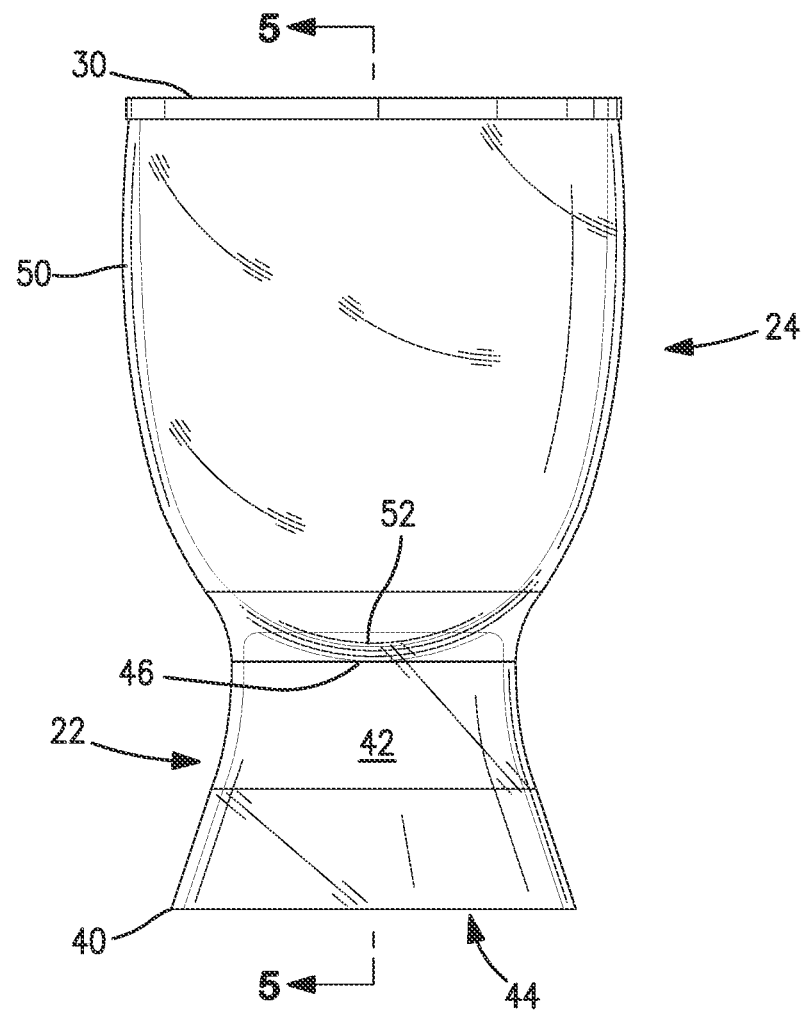
FIG. 2 is a side view of the cup of FIG. 1.
Figure 3:
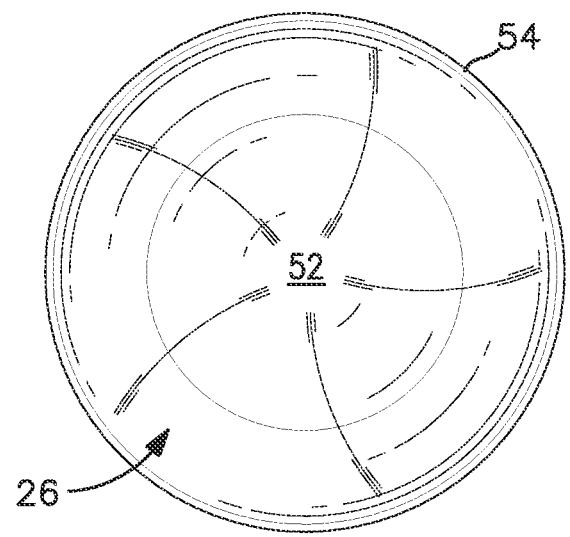
FIG. 3 is a top view of the cup of FIG. 1.
Figure 4:
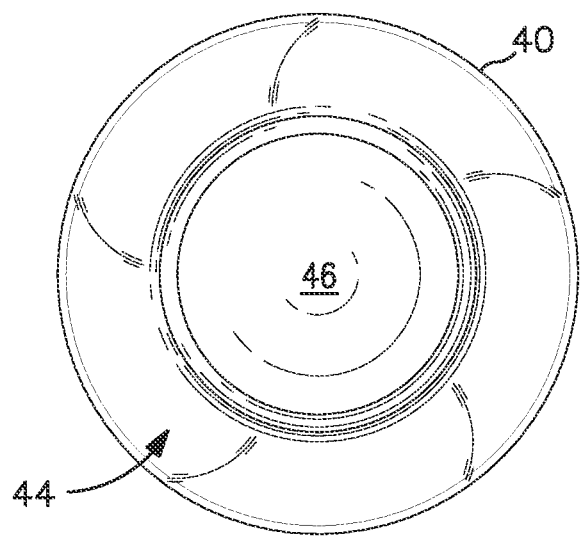
FIG. 4 is a bottom view of the invention of FIG. 1.
Figure 5:
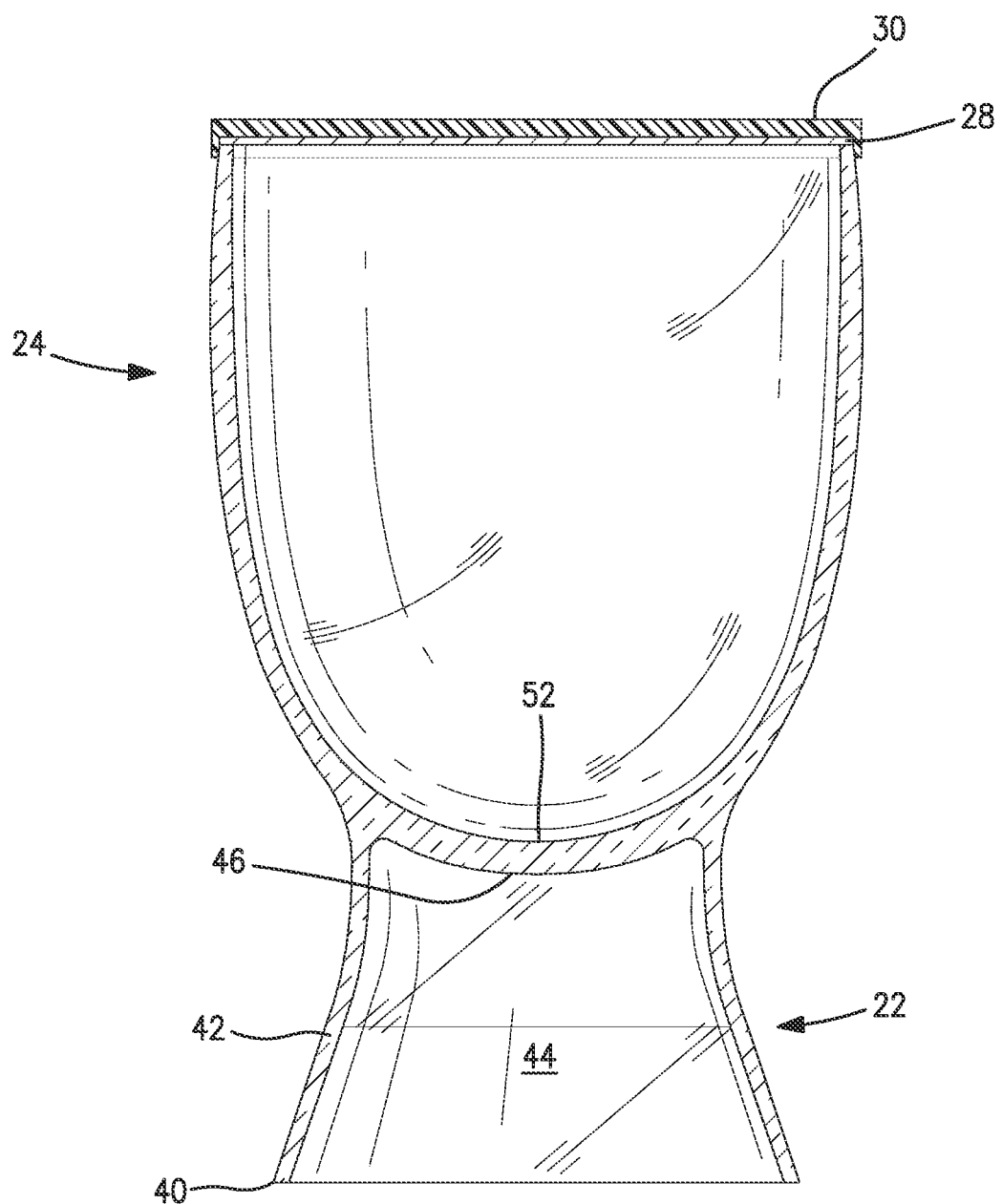
FIG. 5 is a cross-section taken along line 5-5 of FIG. 2.
Figure 6D:
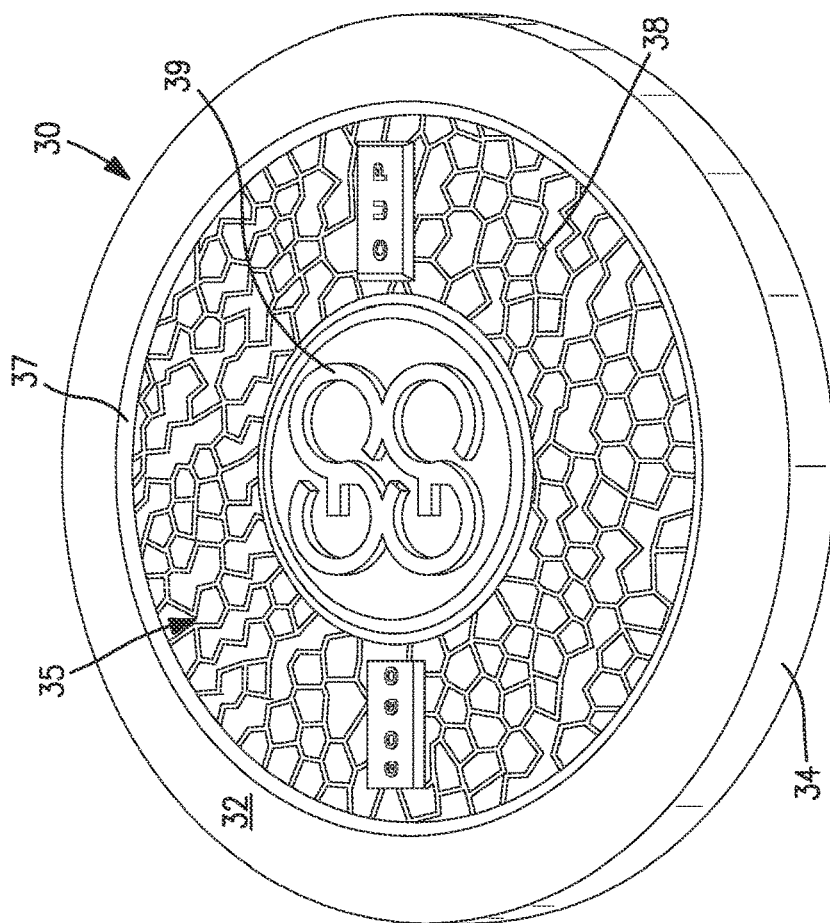
FIG. 6D is a top perspective view of the cover as shown in FIG. 6C with a brand on the cover.
Figure 6C:
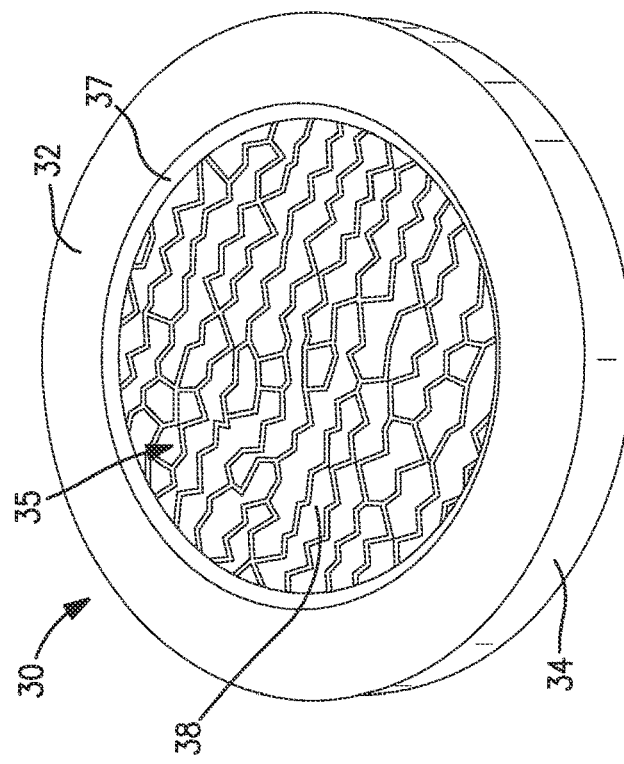
FIG. 6C is a top perspective view of the cover as shown in FIG. 6A.
Figure 7:
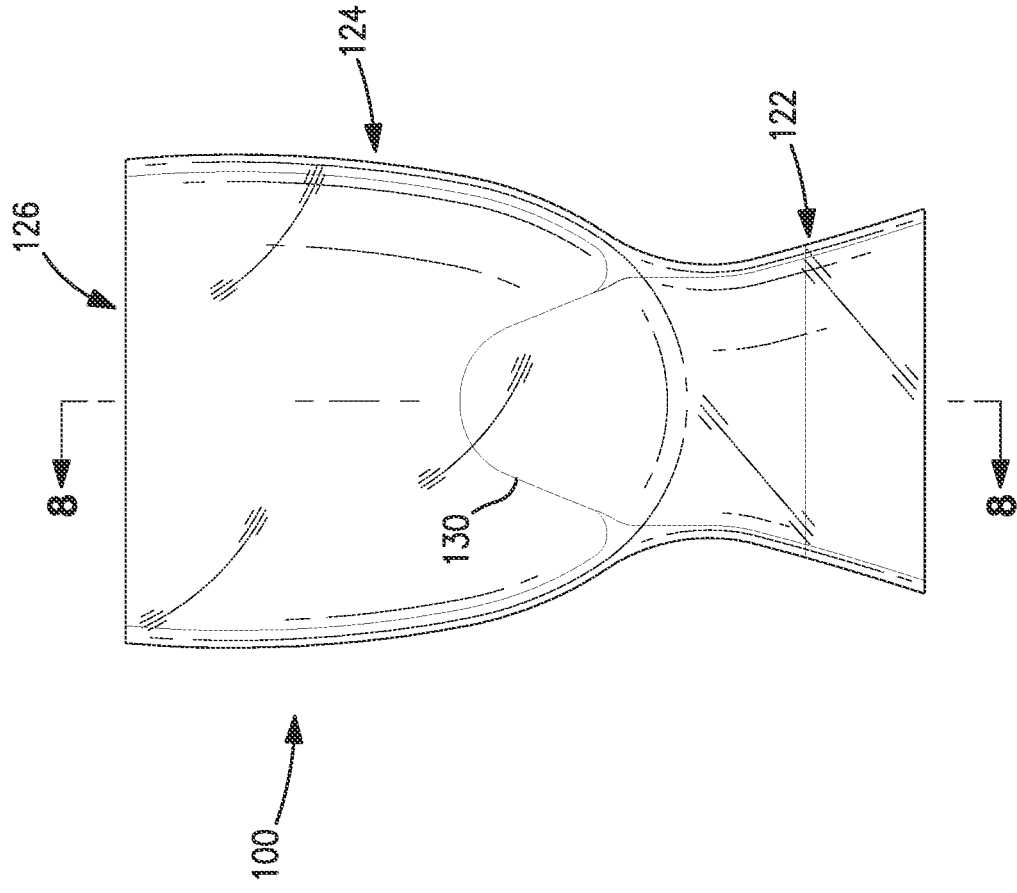
FIG. 7 is an alternative embodiment of the cup similar to FIG. 1 and having a punt base.

Cover 30 as shown, for example, in FIGS. 1, 6C and 6D, is attached to bowl 24 of cup 20 as described above. The cover 30 may include a top wall 32 and side wall 34. In a presently preferred embodiment cover 30 includes a recessed portion 35 having an annular shoulder 37. The recessed portion may include a textured area 38 as shown in FIG. 6C. The textured area 38 may further include a logo and brand name 39, e.g. GOGO™, as shown in FIG. 6D.

The cup 20 is preferably made of a polymer material, a preferred polymer being a polyethylene terephthalate ("PET") material. A preferred PET material may include oxygen inhibitors to preserve and/or extend the wine shelf life. The PET material gives the cup a feeling of a glass container; may be transparent; will not break; and is recyclable. Additionally, the preferred PET material provides a barrier which limits the oxygen penetration and provides for a longer shelf life for the wine. A preferred weight of the cup is in the range of 68 to 75 grams, a preferred weight being 72 grams. This provides a delicately balanced weight to provide a sturdy container while at the same time providing the consumer with a pleasant experience in drinking the wine, similar to drinking from a fine wine glass.

In a preferred embodiment, the diameter of the bowl 24 at top wall 54 is larger than the diameter of the base 22 at bottom wall 40. A preferred diameter of bowl 24 is about 2.83 inches and a preferred outside diameter of the base 22 is about 2.34 inches. In such cases, the cover 30, when removed, may be used as a coaster for placing the base 22 on the underside of the cover 30.

Referring to FIGS. 6A and 6B, the cup 20 is covered with a package 60, e.g. a wrapping material. The wrapping 60 is preferably shrink wrapped onto the cup 20 providing no wrinkles and providing an aesthetically pleasing appearance. The wrapping 60 may include a brand name and/or brand logo and/or other information. The wrapping 60 shields the wine from light and preserves the integrity of the wine. The wrapping 60 may cover a portion of cover 30. When the cup is ready to be opened, the wrapping 60 is removed. In a preferred embodiment and as shown in FIG. 6B, underneath the wrapping 60, cup 20 includes a second package 62 which includes a brand name and/or a brand logo and/or the varietal of the wine and/or other information. As further shown in FIG. 6B, the cup 20 may also include a frosted portion 22A having a brand logo 64. In another aspect of the invention, the brand logo 64 of the base 22 may be raised to provide a grip member for grasping the base when drinking the wine.

In a presently preferred embodiment, the cup 20 may be transparent similar to a traditional wine glass. However, the cup 20 may also have a translucent color or opaque color. Additionally, the cup 20 may be multi-colored, e.g. a base 22 of a translucent color and a transparent bowl 24. Additionally, the cover 30 may be of the same color or different color and may include a design on its underside (not shown) which will be seen when the cover is used as a coaster.

In a preferred embodiment, when using the single serve beverage container, the wrapping material 60 is removed from the container and the cover 30 and foil 28 are thereafter removed. The wine is then ready to be sipped and enjoyed.

Referring to FIGS. 7 and 8, there is shown a presently preferred embodiment of the design of the invention. In this embodiment, there is shown a cup 100 which includes a base 122, a bowl 124 and an opening 126. This cup, similar to that in FIGS. 1-6, may also include a seal 28 and a cover 30 (not shown). The other aspects of cup 100 are substantially similar to cup 20 and are not repeated herein. In this embodiment, the cup 100 further includes a punt base 130 in bowl 124. The punt base serves a number of functions including allowing the control of the head space for the wine; allowing the wine to be closer to the cover (not shown) which thereby lessens the head space and lessens the amount of oxygen in the single serve wine cup; provides an aesthetically pleasing appearance; provides for ease of filling the cup with wine as the wine hits the cone-shaped top of the punt base and spreads more evenly into the cup; provides more storage in the base 122 of the cup when storage is desired; creates the ability to make a larger cup and carry the same amount of wine as required by United States law and International law; and other additional benefits. The punt base 130 may include indicia such as a brand, a logo and a design (e.g. a diamond shaped punt base) such that the indicia may be seen by the user. The dimensions of cup 100 in a presently preferred embodiment are as follows: the height of the cup is about 4.7 inches; the diameter of the top wall of the bowl is about 2.9 inches; the diameter of the bottom wall of the base is about 2.34 inches; and the punt base may be about 0.83 inches in height.

FIGS. 9-11 show another preferred embodiment of the cup invention with a miniature liquor bottle. In this embodiment, there is a cup 200 having a base 222, a bowl 224, an opening 226 (covered by the cover 230 and foil 228), a foil 228, a cover 230, a closure 232 and a cavity 234. The base 222 and bowl 224 are similar to the base 22 and 122 and the bowl 24 and bowl 124 as described above and are not repeated herein except as they differ due to cavity 234 and which will be understood by those skilled in the art. The cavity 234 includes a vertical side wall 236 and top wall 238 adapted to receive liquor bottle 240. The cover 230 is similar to cover 30 as shown, for example, in FIGS. 6C and 6D. As shown in FIGS. 9-11, the cup has a closure 232 for enclosing a miniature liquor bottle 240 in the cavity 234. The closure 232 may include a closure mechanism to hold the closure 232 to the cup 200 such as a tongue in groove mechanism (not shown), friction fit or other closure mechanisms. Additionally, the inside of the closure 232 may have a means for holding the miniature liquor bottle 240 in a non-movable position such as an upwardly extending annular vertical wall 250 adapted to mate with the bottom of liquor bottle 240. In the alternative, other means may be used to hold the liquor bottle 240 in place including a recessed area in closure 232, sizing the cavity such that the liquor bottle fits snuggly in the cavity or other similar means.

As referred to above, the cup 200 may be used to prepare a cocktail such as a margarita. The cavity 234 may hold a miniature liquor bottle 240 of tequila. The bowl 224 will include a margarita mix MM as shown in in FIG. 9. The closure 232 is removed from the cup 200 and the bottle 240 is taken out from base 224. Thereafter, cover 230 and seal 228 are removed and the tequila is poured into the bowl 224 containing the margarita mix, thereby providing for a margarita cocktail.

Referring to FIGS. 30 and 31, there is shown a further embodiment of the cup invention with a miniature liquor bottle. Specifically, there is shown a cup 470 having a bowl 472 for receiving a beverage or similar material to be mixed with another material; cavity 474 for receiving a miniature liquor bottle or similar container 476. The cavity 474 is shown in the side of cup 470. The cavity 474 may be in the base 478 of cup 470. The miniature liquor bottle or container 476 is held in cavity 474 as shown in FIG. 31. The miniature liquor bottle may be held in cavity 474 by, among other things, friction fit; by resilient arms which extend from the inside of cavity 474 and surround and grasp a portion of the miniature liquor bottle (not shown); by a recessed area in the top and/or bottom of the cup cavity. It is understood that the cup 470 may have various shapes, the shapes only being limited by the size of the cavity for receiving the miniature liquor bottle or similar container 476.

Referring to FIGS. 16-29, there are shown alternate embodiments of closure 232. These alternate embodiments are discussed below. It is understood that variations may be made to these embodiments without departing from the scope of the invention.

FIGS. 16A and 16B show an alternative closure 500. FIG. 16A is a top perspective view of the closure 500, and FIG. 16B is a top view of the closure 500. The closure 500 may be used for quickly and inexpensively inserting different shapes and sizes of liquor bottles 240. Specifically, miniature liquor bottles come in different shapes and sizes depending on the manufacturer of the liquor and the type of liquor. For example, a Smirnoff® Vodka bottle is one size, a Tito's® vodka bottle is another size and a Beefeater® gin bottle is another size. In order to adapt to orders for the cup 200 from distilleries, it may necessary to insert different bottles on short notice. The present closure 500 allows for the insertion of different size bottles, including on short notice, simply and inexpensively. Closure 500 also allows for the easy alignment of the label on the bottle 240 with the packaging of the cup 200. The closure 500 includes a bottom wall 502, a side wall 504, molded upright tabs 506, resilient tabs 508, apertures 510 between molded upright tabs 406 and resilient tabs 508 and an opening 512. In practice, the closure 500 is attached to the bottom of cup 200. Thereafter, liquor bottle 240 may be inserted into cup 200 having closure 500 by inserting liquor bottle 240 through opening 512. The label of the liquor bottle is aligned with the outside packaging of cup 200. The liquor bottle 240 is pushed up through opening 512 pushing resilient tabs 508 upward and past molded upright tabs 506. Once the liquor bottle is inside cup 200, resilient tabs 508 move back into a horizontal position holding the liquor bottle 240 in cup 200 and making it impossible to remove the liquor bottle without removing the closure 500. The molded upright tabs 506 will hold liquor bottle 240 in place. This closure will allow for receipt of different size and shape liquor bottles. Closure 500 is shown for receiving a round liquor bottle as seen, for example, by the round opening 514 in FIG. 16B. However, if a square liquor bottle, such as a Jack Daniel® bottle, needs to be inserted into a cup 200, this may be accomplished, by an easy change of the mold core to change the round opening 512 to a square opening.

FIGS. 17A and 17B show another alternative embodiment of a closure 550. FIG. 17A is a top perspective view of the closure 550, and FIG. 17B is a top view of the closure 550. Closure 550 includes a bottom wall 552, a side wall 554 and prongs 556. Prongs 556 serve to hold the liquor bottle 240 in place in bottle 200. In this embodiment, the liquor bottle is first inserted into cup 200 and then closure 500 is attached to cup 200 to enclose liquor bottle 240 in cup 200 and hold it in place by prongs 556.

Figure 18A:
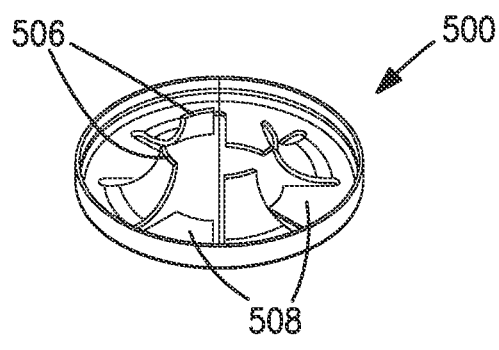
FIGS. 18A and 18B show views of another alternative base closure.
Figure 18B:
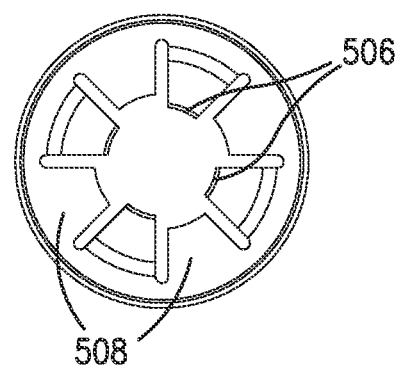

FIGS. 18A and 18B are an alternate embodiment of the closure 500 substantially similar to FIGS. 16A and 16B except that the embodiment includes four molded upright tabs 506 and four resilient tabs 508 and modified shape.

Figure 19A:
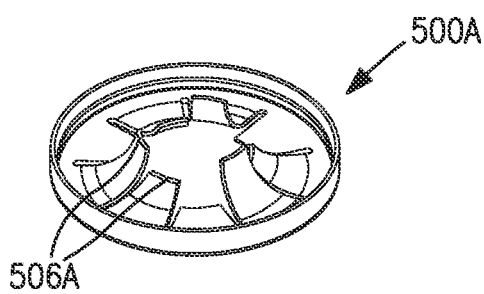
FIGS. 19A and 19B show views of another alternative base closure.
Figure 19B:
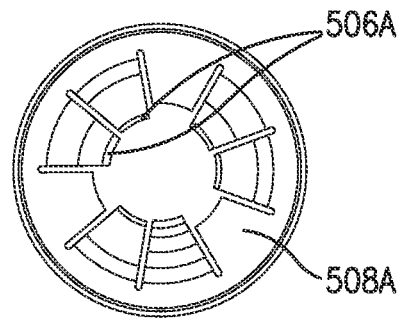

FIGS. 19A and 19B are an alternative embodiment of the closure 500A similar to FIGS. 16A and 16B and 18A and 18B wherein the upright tabs 506A and resilient tabs 508A are of a different shape and configuration as shown in the drawings.

Figure 20A:
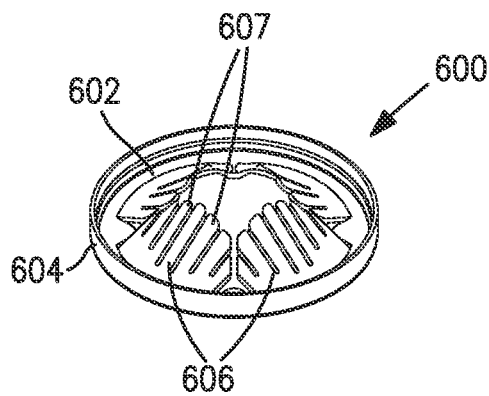
FIGS. 20A and 20B show views of another alternative base closure.
Figure 20B:
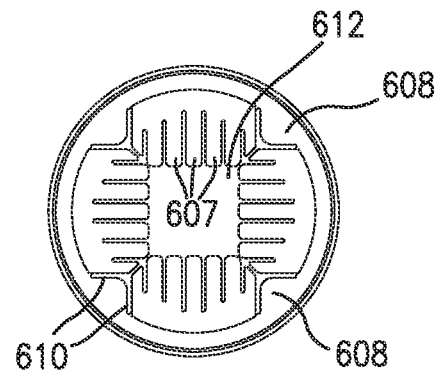

FIGS. 20A and 20B show an alternative closure 600. FIG. 20A is a top perspective view of the closure 600, and FIG. 20B is a top view of the closure 600. The closure 600 may be used for quickly and inexpensively inserting different shapes and sizes of liquor bottles 240. Specifically, miniature liquor bottles come in different shapes and sizes depending on the manufacturer of the liquor and the type of liquor. In order to adapt to orders for the cup 200 from distilleries, it may necessary to insert different bottles on short notice. The present closure 600 allows for the insertion of different size bottles and different shaped bottles, e.g. a round or square shaped bottle, including on short notice, simply and inexpensively. Closure 600 also allows for the easy alignment of the label on the bottle 240 with the packaging of the cup 200. The closure 600 includes a bottom wall 602, a side wall 604, molded upright tabs 606 having a plurality of fingers 607, resilient tabs 608, apertures 610 between molded upright tabs 606 and resilient tabs 608 and an opening 612. Opening 612 is smaller than liquor bottle 240. In practice, the closure 600 is attached to the bottom of cup 200. Thereafter, liquor bottle 240 may be inserted into cup 200 having closure 600 by inserting liquor bottle 240 through opening 612. The label of the liquor bottle is aligned with the outside packaging of cup 200. The liquor bottle 240 is pushed up through opening 612 pushing past molded upright tabs 606 with fingers 607. Once the liquor bottle is inside cup 200, tabs 606 move downward and the fingers 607 hold the liquor bottle 240 in cup 200 and making it impossible to remove the liquor bottle without removing the closure 600. The molded upright tabs 606 with fingers 607 will hold liquor bottle 240 in place. This closure will allow for receipt of different size and shape liquor bottles.

Figure 21A:
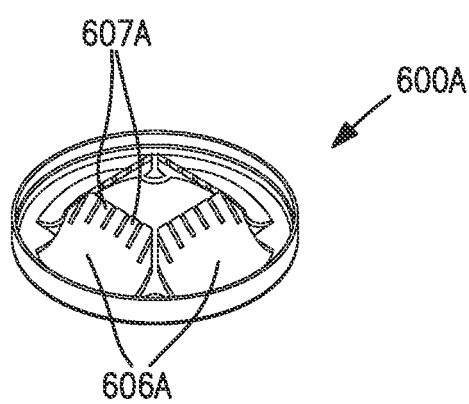
FIGS. 21A and 21B show views of another alternative base closure.
Figure 21B:
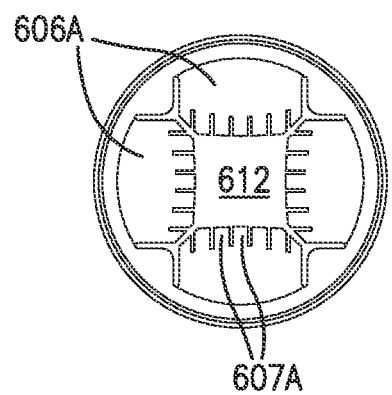

FIGS. 21A and 21B are directed to alternate closure 600A which is similar to the closure of FIGS. 20A and 20B with the exception of the shape of molded upright tabs 606A and fingers 607A wherein the remaining components of closure 600A are substantially similar to base closure 600.

Figure 22A:
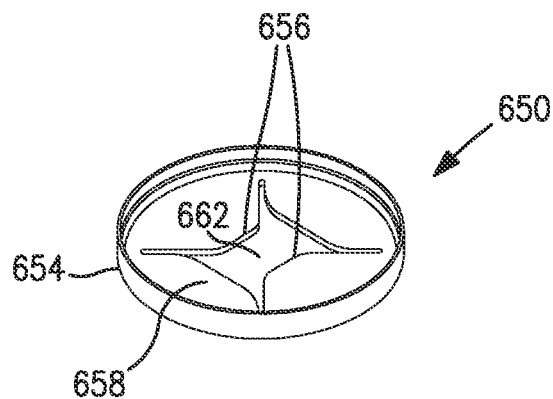
FIGS. 22A and 22B show views of another alternative base closure.
Figure 22B:
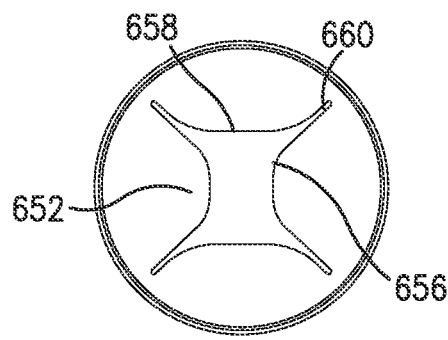

FIGS. 22A and 22B show an alternative closure 650. FIG. 22A is a top perspective view of the closure 650, and FIG. 22B is a top view of the closure 650. The closure 650 may be used for quickly and inexpensively inserting different shapes and sizes of liquor bottles 240. Closure 650 also allows for the easy alignment of the label on the bottle 240 with the packaging of the cup 200. The closure 650 includes a bottom wall 652, a side wall 654, molded tabs 656, resilient tabs 658, apertures 660 between molded tabs 656 and resilient tabs 658 and an opening 662. In practice, the closure 650 is attached to the bottom of cup 200. Thereafter, liquor bottle 240 may be inserted into cup 200 having closure 650 by inserting liquor bottle 240 through opening 662. The label of the liquor bottle is aligned with the outside packaging of cup 200. The liquor bottle 240 is pushed up through opening 662 pushing resilient tabs 658 upward and past molded tabs 656. Once the liquor bottle is inside cup 200, resilient tabs 658 move back into a horizontal position holding the liquor bottle 240 in cup 200 and making it impossible to remove the liquor bottle without removing the closure 650. The molded tabs 656 will hold liquor bottle 240 in place. This closure will allow for receipt of different size and shape liquor bottles.

Figure 23A:
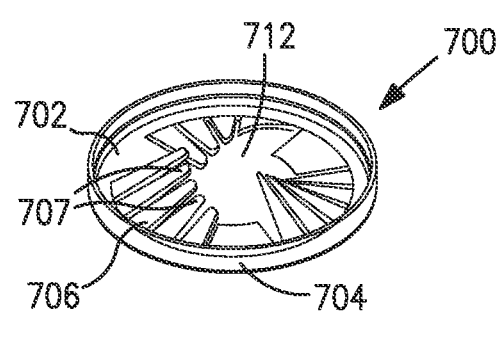
FIGS. 23A and 23B show views of another alternative base closure.
Figure 23B:
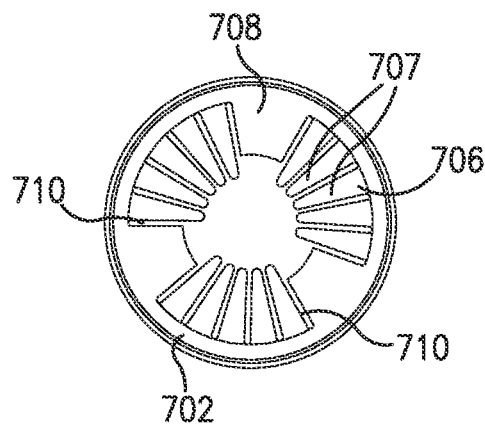

FIGS. 23A and 23B show an alternative closure 700. FIG. 23A is a top perspective view of the closure 700, and FIG. 23B is a top view of the closure 700. The closure 700 may be used for quickly and inexpensively inserting different shapes and sizes of liquor bottles 240. Closure 700 also allows for the easy alignment of the label on the bottle 240 with the packaging of the cup 200. The closure 700 includes a bottom wall 702, a side wall 704, molded upright tabs 706 having fingers 707, resilient tabs 708, apertures 710 between molded upright tabs 706 and resilient tabs 708 and an opening 712. In practice, the closure 700 is attached to the bottom of cup 200. Thereafter, liquor bottle 240 may be inserted into cup 200 having closure 700 by inserting liquor bottle 240 through opening 712. The label of the liquor bottle is aligned with the outside packaging of cup 200. The liquor bottle 240 is pushed up through opening 712 pushing resilient tabs 708 upward and past molded upright tabs 706 having fingers 707. Once the liquor bottle is inside cup 200, resilient tabs 708 move back into a horizontal position holding the liquor bottle 240 in cup 200 and making it impossible to remove the liquor bottle without removing the closure 700. The molded upright tabs 706 with fingers 707 will hold liquor bottle 240 in place. This closure will allow for receipt of different size and shape liquor bottles.

Figure 24A:
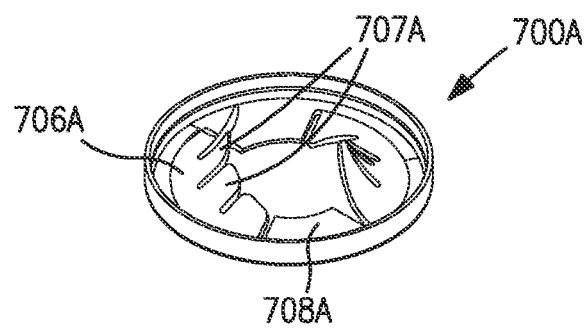
FIGS. 24A and 24B show views of another alternative base closure.
Figure 24B:
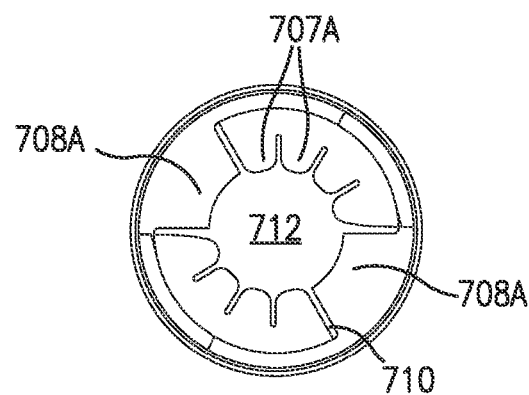

FIGS. 24A and 24B are directed to alternate closure 700A which are similar to FIGS. 23A and 23B with the exception of the shape and number of molded upright tabs 706A having fingers 707A and resilient tabs 708A. The remaining components of closure 700A are substantially similar to closure 700.

Figure 25A:
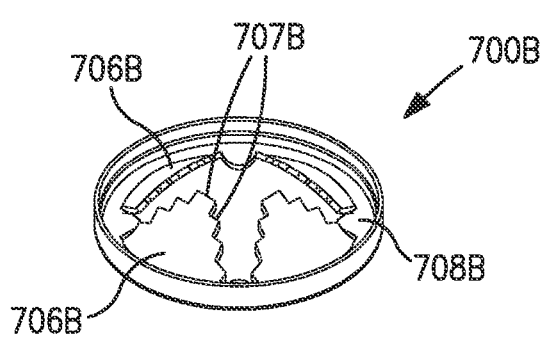
FIGS. 25A and 25B show views of another alternative base closure.
Figure 25B:
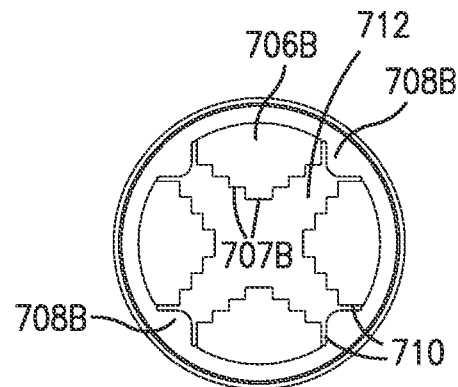

FIGS. 25A and 25B are directed to alternate closure 700B which are similar to FIGS. 23A and 23B and FIGS. 24A and 24B with the exception of the shape of molded upright tabs 706B having fingers 707B and resilient tabs 708B. The remaining components of closure 700B is substantially similar to closures 700 and 700A.

Figure 26A:
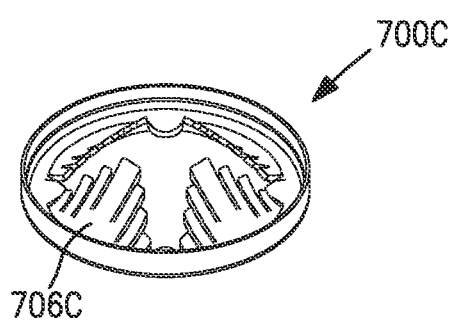
FIGS. 26A and 26B show views of another alternative base closure.
Figure 26B:
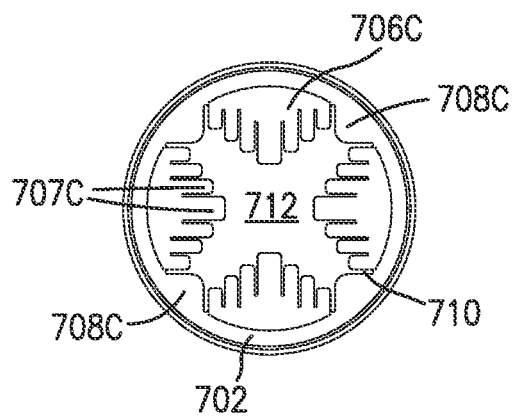

FIGS. 26A and 26B are directed to alternate closure 700C which are similar to FIGS. 23-25 with the exception of the shape of molded upright tabs 706C having fingers 707C and resilient tabs 708C. The remaining components of closure 700C is substantially similar to closures 700, 700A and 700B.

Figure 27A:
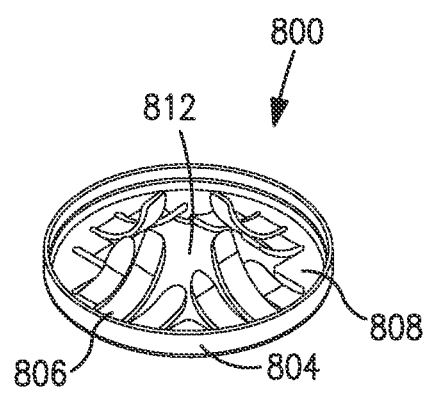
FIGS. 27A and 27B show views of another alternative base closure.
Figure 27B:
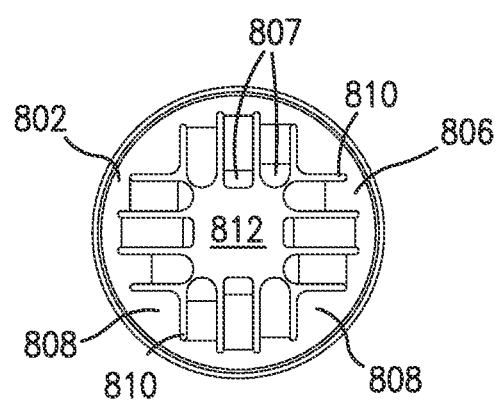

FIGS. 27A and 27B show an alternative closure 800. FIG. 27A is a top perspective view of the closure 800, and FIG. 27B is a top view of the closure 800. The closure 800 may be used for quickly and inexpensively inserting different shapes and sizes of liquor bottles 240. Closure 800 also allows for the easy alignment of the label on the bottle 240 with the packaging of the cup 200. The closure 800 includes a bottom wall 802, a side wall 804, molded upright tabs 806 comprising three different size fingers 807, resilient tabs 808, apertures 810 between molded upright tabs 806 and resilient tabs 808 and an opening 812. In practice, the closure 800 is attached to the bottom of cup 200. Thereafter, liquor bottle 240 may be inserted into cup 200 having closure 800 by inserting liquor bottle 240 through opening 812. The label of the liquor bottle is aligned with the outside packaging of cup 200. The liquor bottle 240 is pushed up through opening 812 pushing resilient tabs 808 upward and past molded upright tabs 806 having fingers 807. Once the liquor bottle is inside cup 200, resilient tabs 808 move back into a horizontal position holding the liquor bottle 240 in cup 200 and making it impossible to remove the liquor bottle without removing the closure 800. The molded upright tabs 806 having fingers 807 will hold liquor bottle 240 in place. This closure will allow for receipt of different size and shape liquor bottles.

Figure 28A:
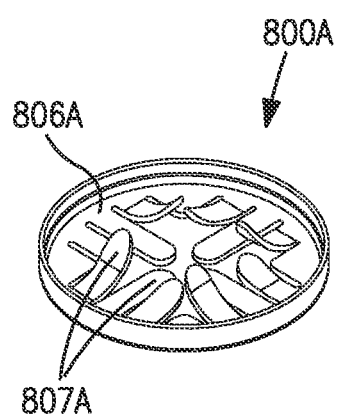
FIGS. 28A and 28B show views of another alternative base closure.
Figure 28B:
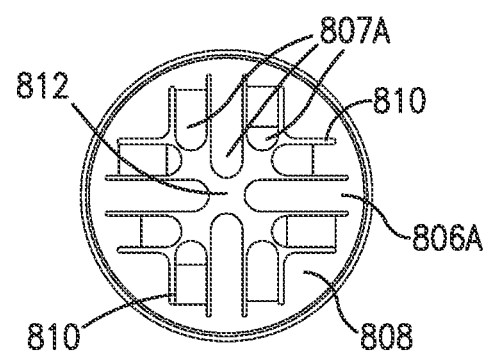

FIGS. 28A and 28B are directed to alternate closure 800A which is similar to FIGS. 27A and 27B with the exception of the size shape of the molded upright tabs 806A having fingers 807A. The remaining components of base closure 800A are substantially similar to base closure 800.

Figure 29A:
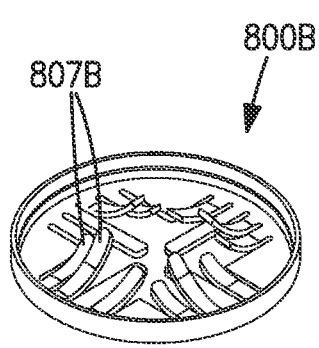
FIGS. 29A and 29B show views of another alternative base closure.
Figure 29B:
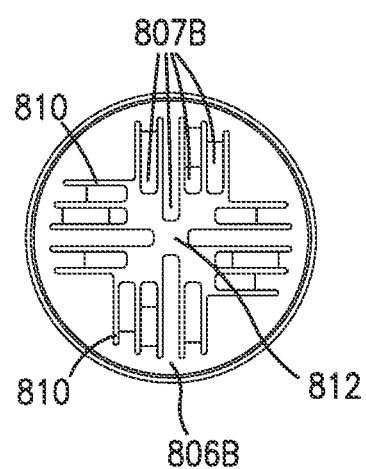

FIGS. 29A and 29B are directed to alternate closure 800B which is similar to FIGS. 27 and 28 with the exception of the size and shape of molded upright tabs 806B having fingers 807B. The remaining components of base 800B are substantially similar to closures 800 and 800A.

Figure 12:
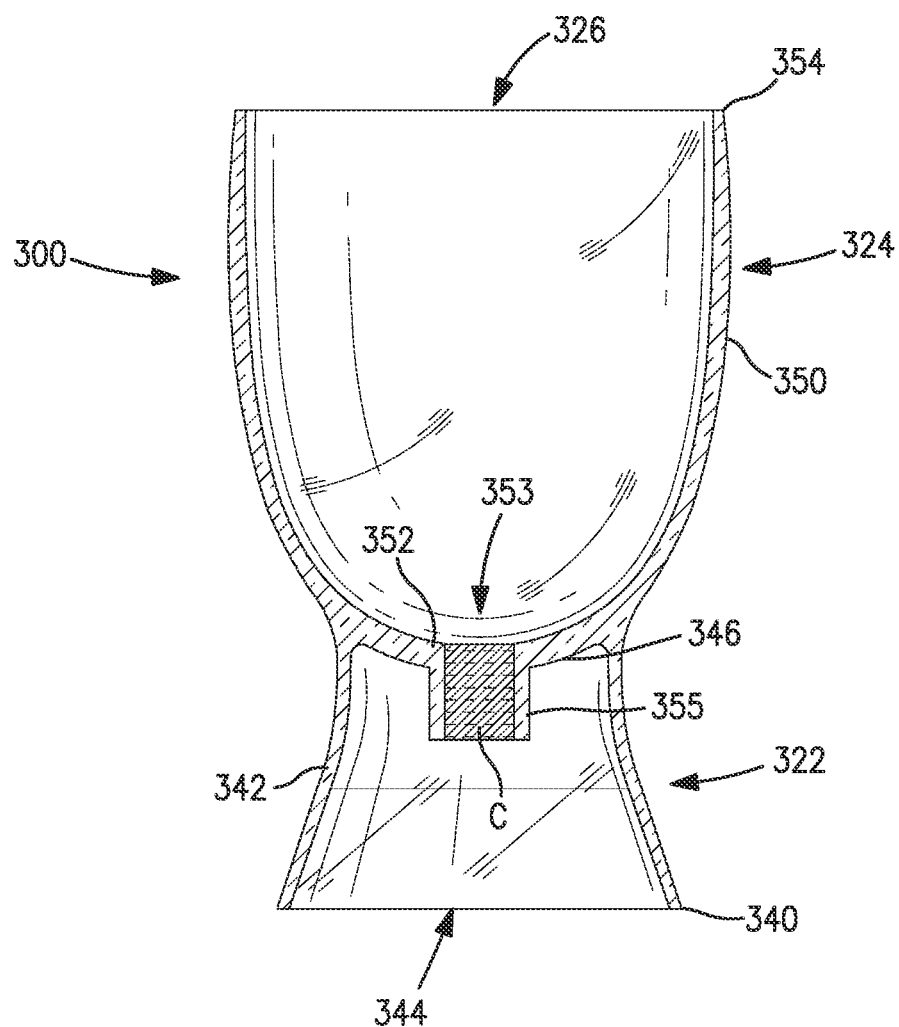
FIG. 12 is another alternative embodiment of the invention showing a cup similar to FIG. 1 in cross-section and having an opening in the bottom of the bowl for filling the wine and receiving a cork after the wine is filled into the cup.
Figure 13:
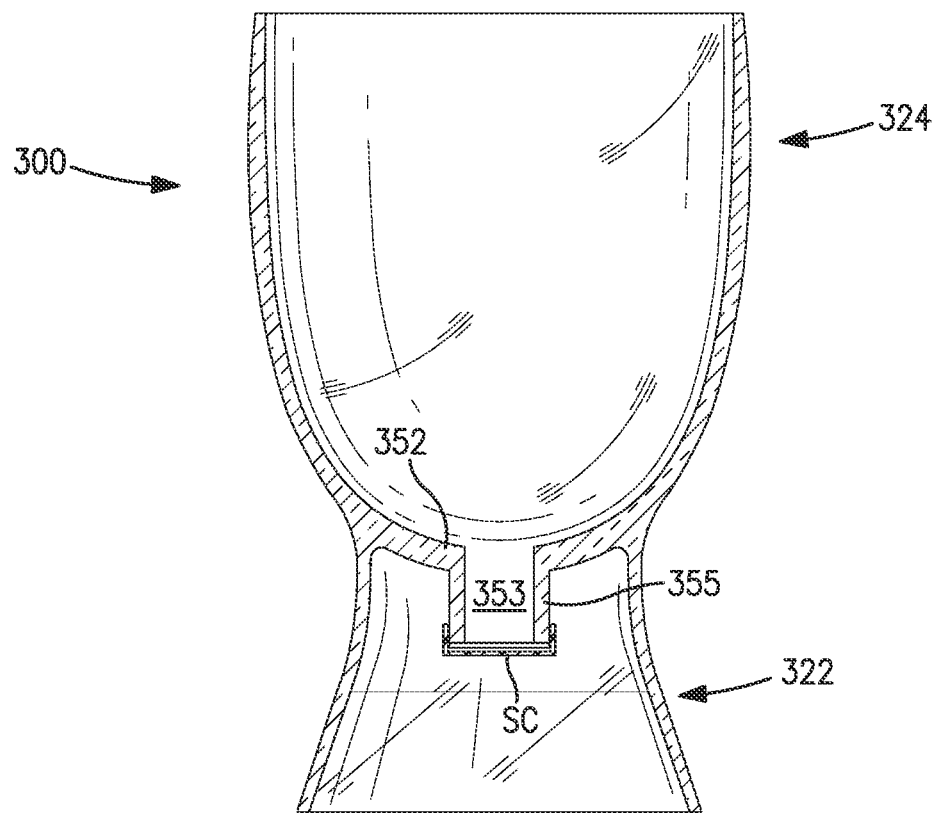
FIG. 13 is an alternative embodiment to FIG. 12 wherein the wine is filled from the bottom of the bowl of the cup and has a screw cap as opposed to a cork.
Figure 14:
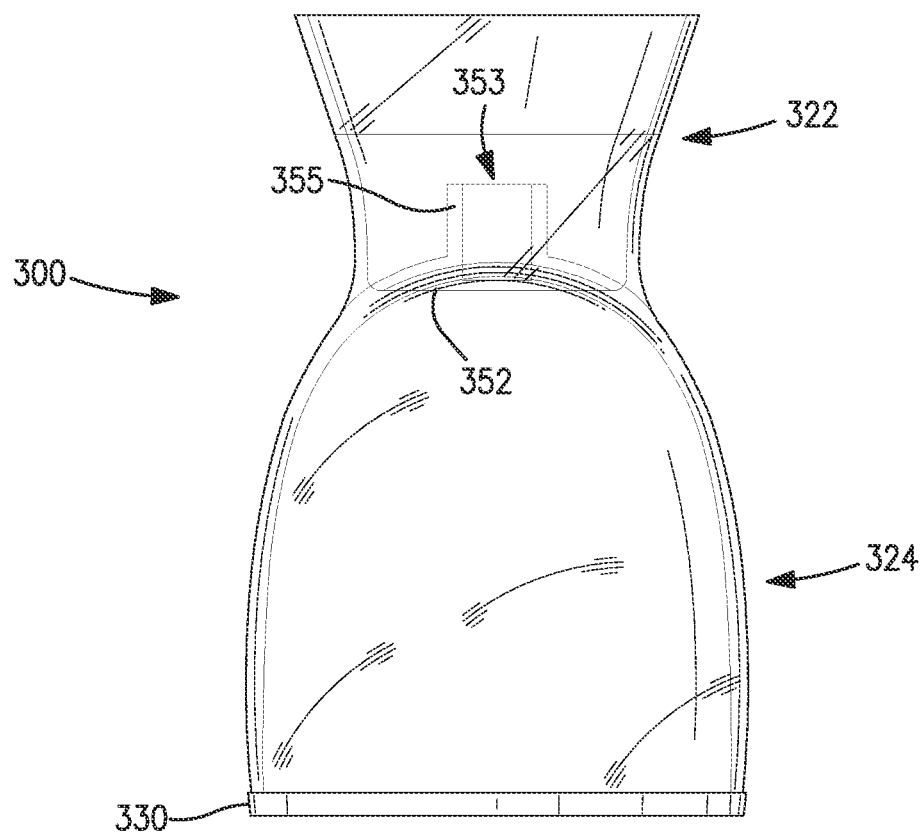
FIG. 14 shows the cup of FIG. 12 having the cover attached to the cup and without the cork and inverted for filling with wine in a conventional wine filling system and thereafter inserting a cork.
Figure 15:
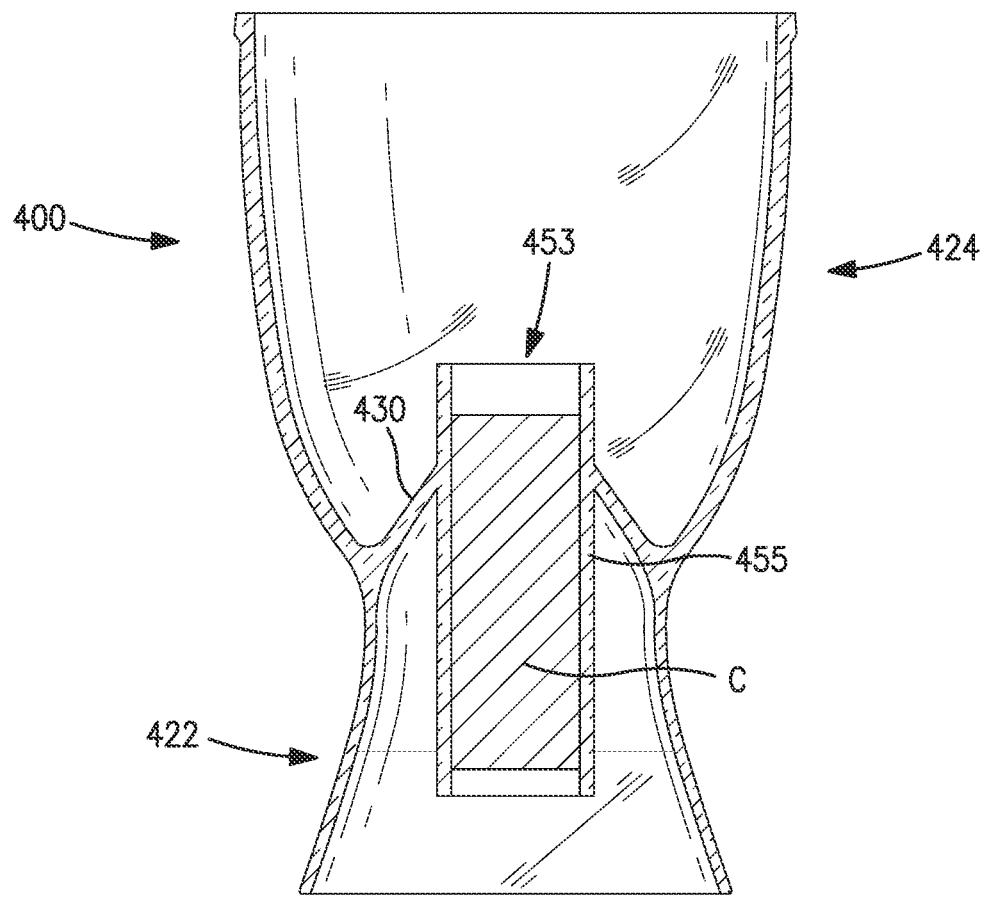
FIG. 15 shows a cup similar to FIGS. 7 and 8 having a punt base in the bottom of the bowl and having an opening for filling wine into the cup in a conventional filling line and then inserting a cork.

As referenced above, the cups in FIGS. 1-8 are intended to fill the wine from the top of the cups 20 and 100 and then close the cup, for example, by foils 28 and 128 and covers 30 and 130. Alternative embodiments of these cups are shown in FIGS. 12-15 wherein the cup may be filled using a conventional filling line for a wine bottle utilizing a cork or screw cap to enclose the cup after the cup is filled. Referring to FIG. 12, there is a cup 300 which is substantially similar to cup 20 of FIG. 1 and is shown in cross-section. Cup 300, like cup 20, includes a base 322 and bowl 324 having similar attributes as cup 20 and which are not repeated in detail herein. Cup 300 includes an opening 353 comprising an annular wall 355 in the bottom wall 352 of the bowl 324 for filling the wine and receiving a cork C after the wine is filled into the cup 300. FIG. 13 is an alternative embodiment to FIG. 12 wherein the wine is filled from the bottom of the bowl 324 of the cup and has a screw cap SC as opposed to a cork. FIG. 14 shows the cup 300 of FIG. 12 having a cover 330 attached to the cup without the cork and inverted for filling with wine in a conventional wine filling system and thereafter inserting a cork. FIG. 15 shows a cup 400 similar to FIGS. 7 and 8 having a base 422 and bowl 424. The cup 400 is substantially the same as cup 100 and the other aspects of cup 400 will not be repeated in detail herein. Cup 400 includes punt base 430 in the bottom of the bowl 424 and having an opening 453 comprising an annular wall 455 for filling wine into the cup in a conventional filling line and then inserting a cork C.

More particularly, referring to FIGS. 12 and 13, there is shown a cup 300 having similar attributes as the cup shown in FIG. 1 and including a base 322, a bowl 324, an opening 326, a seal (not shown) and a cover (not shown). The seal and cover are similar to that shown in FIG. 1 and described above. The base 322 has a bottom wall 340, a side 342 and an opening 344 and a top wall 346 which is the outside portion of the bottom of the bowl 324. The bowl 324 includes a side wall 350, a bottom wall 352 and a top wall or lip 354. The cup is first closed with, for example, a foil seal (not shown) and a cover 330, similar to that shown in FIG. 1. Once the cup is closed, the cup is inverted as shown in FIG. 14 and may be filled by a conventional wine filling system through opening 353 in bottom wall 352. The opening 353 includes an annular wall 355 for receiving a cork C after the cup is filled as shown in FIG. 12. The cup is filled through the opening 353 and thereafter a cork C is inserted into opening 353 to close the cup. When utilizing the single serve cup 300, the cover 330 is taken off and the seal 28 removed. It is understood that the opening 353 may be of different configurations wherein the annular wall 355 is on the outside of the bowl 324, or on the inside of the bowl 324 or on both the inside and the outside of bowl 324.

Referring to FIG. 13, there is shown an alternative embodiment of the cup 300 wherein the cup is filled with a conventional wine filling system and instead of using a cork to seal the bottom of the cup, a screw cap SC is used. In this instance, the annular wall 355 includes threads for receiving the corresponding threads of the screw cap. By using a conventional wine filling system for the cups shown in FIGS. 12-14, expense is saved by not having to use a special filling line.

Referring to FIG. 15, there is shown a cup 400 similar to the cups shown in FIGS. 7 and 8 having a punt base 430. The punt base serves one or more of the purposes noted above, including serving to control the dimensions and configuration of the cup while receiving the about 187 ml of wine. This embodiment illustrates closing the cup after filling with a cork C, although a screw cup may be used. Further, this embodiment includes an annular wall 455 for receiving a cork C, similar to as disclosed in FIGS. 12-14. The cup of FIG. 15 may be filled similar to as described for the cup of FIGS. 12-14.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, the cups of the invention (such as cup 20) are described as an integral unit, although the cups may be two or more parts, e.g. a base and a bowl connected by a suitable means such as friction fit. Such modifications being within the ability of one skilled in the art form a part of the present invention and are embraced by the appended claims.

It is claimed:

1. A beverage cup comprising a base, a bowl, and a bottom cover,
    wherein said base comprises a bottom wall, a side wall and a top wall constructed and arranged to form an open bottom area in said base,
    wherein said bowl comprises a bottom wall, a side wall and a top wall constructed and arranged to form an opening at said top wall and said bottom wall of said bowl substantially corresponds to said top wall of said base,
    wherein at least a portion of said top wall of said base and at least a portion of said bottom wall of said bowl form a cavity adapted to receive a container,
    wherein said bottom cover is located at the bottom wall of said base and adapted to enclose said container in said open bottom of said base; and
    wherein said bottom cover further includes an opening therein for receiving said container through said opening of said bottom cover and for maintaining said container in said cavity of said cup.

2. The beverage cup according to claim 1 wherein said cup is made of plastic.

3. The beverage cup according to claim 2 wherein said plastic is polyethylene terephthalate.

4. The beverage cup according to claim 3 wherein said polyethylene terephthalate includes an oxygen inhibitor.

5. The beverage cup according to claim 1 wherein said opening in said bottom cover comprises a plurality of upright tabs and a plurality of resilient tabs.

6. The beverage cup according to claim 1 wherein said bottom cover further comprises a bottom wall having said opening, a side wall, upright tabs, and resilient tabs.

7. The beverage cup according to claim 6 wherein said upright tabs have a plurality of fingers.

8. The beverage cup according to claim 7 wherein there is an aperture between said upright tabs and said resilient tabs.

9. The beverage cup according to claim 8 wherein there are four resilient tabs and four upright tabs.

10. The beverage cup according to claim 9 wherein each of the four resilient tabs include seven fingers.

11. The beverage cup according to claim 1 wherein the bottom cover is attached to the bottom wall of the base by a tongue in groove mechanism or a friction fit mechanism.

12. The beverage cup according to claim 10 wherein the bottom cover is attached to the bottom wall of the base by a tongue in groove mechanism or a friction fit mechanism.

13. A beverage cup comprising a base, a bowl, and a bottom cover,
    wherein said base comprises a bottom wall, a side wall and a top wall constructed and arranged to form an open bottom area in said base,
    wherein said bowl comprises a bottom wall, a side wall and a top wall constructed and arranged to form an opening at said top wall and said bottom wall of said bowl substantially corresponds to said top wall of said base,
    wherein at least a portion of said top wall of said base and at least a portion of said bottom wall of said bowl form a cavity adapted to receive a container,
    wherein said bottom cover is located at the bottom wall of said base and adapted to enclose said container in said open bottom of said base, and
    wherein said bottom cover further includes an opening therein having a plurality of upright tabs and a plurality of resilient tabs for maintaining said container in said cavity of said cup.

14. The beverage cup according to claim 13 wherein said cup is made of plastic.

15. The beverage cup according to claim 14 wherein said plastic is polyethylene terephthalate.

16. The beverage cup according to claim 13 wherein said bottom cover further comprises a bottom wall having said opening and a side wall.

17. The beverage cup according to claim 16 wherein said upright tabs have a plurality of fingers.

18. The beverage cup according to claim 13 wherein the bottom cover is attached to the bottom wall of the base by a tongue in groove mechanism or a friction fit mechanism.

* * * * *